US012285368B2

(12) United States Patent
Freelend et al.

(10) Patent No.: US 12,285,368 B2
(45) Date of Patent: Apr. 29, 2025

(54) BEDDING FOUNDATION HAVING MULTIPLE LIFT ACTUATORS FOR MASSAGE EFFECT

(71) Applicant: L&P Property Management Company, South Gate, CA (US)

(72) Inventors: Isaac T. Freelend, Reeds, MO (US); Jacob J. Neuenswander, Carthage, MO (US); Jason J. Stokesbary, Joplin, MO (US)

(73) Assignee: L&P Property Management Company, South Gate, CA (US)

(*) Notice: Subject to any disclaimer, the term of this patent is extended or adjusted under 35 U.S.C. 154(b) by 397 days.

(21) Appl. No.: 17/745,079

(22) Filed: May 16, 2022

(65) Prior Publication Data

US 2022/0265499 A1 Aug. 25, 2022

Related U.S. Application Data

(63) Continuation-in-part of application No. 17/239,801, filed on Apr. 26, 2021, now Pat. No. 11,641,947.

(60) Provisional application No. 63/025,348, filed on May 15, 2020.

(51) Int. Cl.
*A61G 13/00* (2006.01)
*A61H 15/00* (2006.01)

(52) U.S. Cl.
CPC ....... *A61G 13/009* (2013.01); *A61H 15/0078* (2013.01); *A61H 2201/0146* (2013.01); *A61H 2201/1659* (2013.01); *A61H 2201/1664* (2013.01)

(58) Field of Classification Search
CPC ..... A47C 19/025; A47C 23/02; A47C 21/006; A61H 2201/0142; A61H 1/0292; A61H 1/008; A61H 17/0078; A61H 2201/0146; A61H 2201/1659; A61H 2201/1664; A61H 2201/1654; A61H 7/001; A61G 7/0573; A61G 13/009; F16B 2200/50; F16B 12/42; F16B 12/54; A47B 13/003; A47B 2013/006
See application file for complete search history.

(56) References Cited

U.S. PATENT DOCUMENTS 1,276,526 A 8/1918 Hardy et al.
1,375,652 A * 4/1921 Carlotti .............. A61H 15/0078 91/25
1,617,593 A 2/1927 Hardy
(Continued)

FOREIGN PATENT DOCUMENTS

CN 105455982 A * 4/2016

*Primary Examiner* — Justin C Mikowski
*Assistant Examiner* — Alison N Labarge
(74) *Attorney, Agent, or Firm* — Wood Herron & Evans LLP

(57) ABSTRACT

A bedding foundation has a linear actuator for moving a roller carriage forward and backwards. The roller carriage includes wheels which move along rails supported below a rigid platform having an opening extending through the platform. The roller carriage includes a lifter which raises and lowers a roller independently of the movement of the linear actuator. Regardless of the position of the linear actuator, the roller may be raised or lowered. The roller moves back and forth inside the opening extending through the rigid platform and imparts a massage movement to a mattress above the foundation.

20 Claims, 22 Drawing Sheets

(56) References Cited

U.S. PATENT DOCUMENTS

| | | | | | |
|---|---|---|---|---|---|
| 1,978,223 | A * | 10/1934 | Parker | A61H 23/02 | 601/103 |
| 1,999,412 | A | 4/1935 | Hardy | | |
| 2,360,975 | A | 10/1944 | Petersen | | |
| 3,207,152 | A * | 9/1965 | Thornton | A61H 7/004 | 601/87 |
| 3,298,363 | A | 1/1967 | Parkin | | |
| 4,699,126 | A * | 10/1987 | Lancaster | A61H 1/00 | 601/102 |
| 4,947,833 | A * | 8/1990 | Yamasaki | A61H 15/0078 | 601/102 |
| 5,088,475 | A * | 2/1992 | Steffensmeier | A61H 15/0078 | 601/102 |
| 6,454,731 | B1 * | 9/2002 | Marcantoni | A61H 15/0078 | 601/99 |
| 9,724,257 | B1 | 8/2017 | Chen et al. | | |
| 2005/0010143 | A1 * | 1/2005 | Kim | A61H 15/02 | 601/99 |
| 2006/0036202 | A1 | 2/2006 | Iwata et al. | | |
| 2017/0312155 | A1 | 11/2017 | Copetti | | |
| 2018/0372138 | A1 * | 12/2018 | Li | A47C 19/20 | |
| 2019/0239652 | A1 | 8/2019 | Chung | | |
| 2020/0078240 | A1 * | 3/2020 | Hsieh | A61G 5/006 | |
| 2021/0121345 | A1 * | 4/2021 | Chung | A47C 20/041 | |
| 2021/0393043 | A1 * | 12/2021 | Wang | A47C 19/025 | |

* cited by examiner

BEDDING FOUNDATION HAVING MULTIPLE LIFT ACTUATORS FOR MASSAGE EFFECT

CROSS-REFERENCE TO RELATED APPLICATIONS

This application is a Continuation-In-Part of U.S. patent application Ser. No. 17/239,801 filed Apr. 26, 2021 (pending), which claims the benefit of priority to U.S. Provisional Patent Application Ser. No. 63/025,348 filed May 15, 2020 , the disclosures of which are incorporated by reference herein in their entirety.

FIELD OF THE INVENTION

This invention relates generally to a bedding foundation having multiple lift actuators to impart a massage effect or lumbar support to a mattress above the bedding foundation.

BACKGROUND OF THE INVENTION

In the bedding industry, bases or foundations for supporting mattresses fall into two categories: 1) stationary foundations, which do not have any moving parts, and 2) adjustable bed bases which are usually motorized and have moving parts for inclining a portion of a mattress resting on the adjustable bed base and sometimes vibrating a portion of a mattress resting on the adjustable bed base.

Commonly adjustable bed bases include one or more motors which activate one or more drivers of the adjustable bed base to raise a portion of the bed base and mattress. In addition, such adjustable bed bases may include one or more vibratory motors which may impart vibrations to the mattress for a "massage" type effect or feel. Consequently, due to the hardware and electronics necessary to move a portion of an adjustable bed base, the adjustable bed base may be heavy and difficult to transport. Conventional stationary bedding foundations are commonly much lighter and easier to transport.

Adjustable bed bases are typically more expensive than conventional stationary bedding foundations because they have one or more motors for moving parts. Thus, a need exists in the bedding industry for a bedding foundation which combines desirable features of both adjustable bed bases and conventional standard bedding foundations.

SUMMARY OF THE INVENTION

According to one aspect of the invention, a bedding foundation comprises a generally rectangular frame supported by legs. The generally rectangular frame may be made at least partially of hollow members to reduce the weight of the bedding foundation. The frame includes multiple transversely extending slats extending between hollow side members of the frame in multiple embodiments.

The bedding foundation further comprises a plurality of trays supported by or suspended by the slats of the generally rectangular frame. Multiple lift actuators are mounted inside the trays. Each lift actuator raises and lowers a lift plate. The lift actuators are programmed to move the lift plates in a vertical direction in a predetermined pattern. In one embodiment, the bedding foundation has eight lift actuators. However, any number of lift actuators may be incorporated into the bedding foundation. Some of the trays may hold only one lift actuator; other trays may hold multiple lift actuators.

In a second aspect, a bedding foundation comprises a frame supported by legs and trays supported by the frame. The bedding foundation further comprises at least one lift actuator secured inside each of the trays. A lift plate is operatively coupled to each of the lift actuators and is moveable by the lift actuator. Each of the lift plates of the lift actuators is moveable in the vertical direction by the lift actuator.

In one preferred embodiment, each of the lift plates is the same size. In other embodiments, the lift plates are different sizes. In one preferred embodiment, each of the lift plates has the same upper profile. In other embodiments, the lift plates have upper profiles which differ from each other. Support plates may be secured to the lift plates. The support plates may be the same size or alternatively, different sizes. A cushion made at least partially of foam may at least partially surround each of the support plates.

In a third aspect, a method of providing a massaging feeling to a mattress from a massage mechanism built into a bedding foundation. The first step in the method comprises raising and lowering multiple lift plates using lift actuators. The lift actuators are supported by or suspended by a generally rectangular frame, the frame being supported by legs. The lift actuators are secured to trays suspended by slats extending between side members of the frame. The lift actuators are programmed to raise and lower the lift plates in a predetermined manner when activated.

The accompanying drawings, which are incorporated in and constitute a part of this specification, illustrate embodiments of the invention and, together with the summary of the invention given above, and the detailed description of the drawings given below, explain the principles of the present invention.

DETAILED DESCRIPTION OF THE INVENTION

Figure 1:
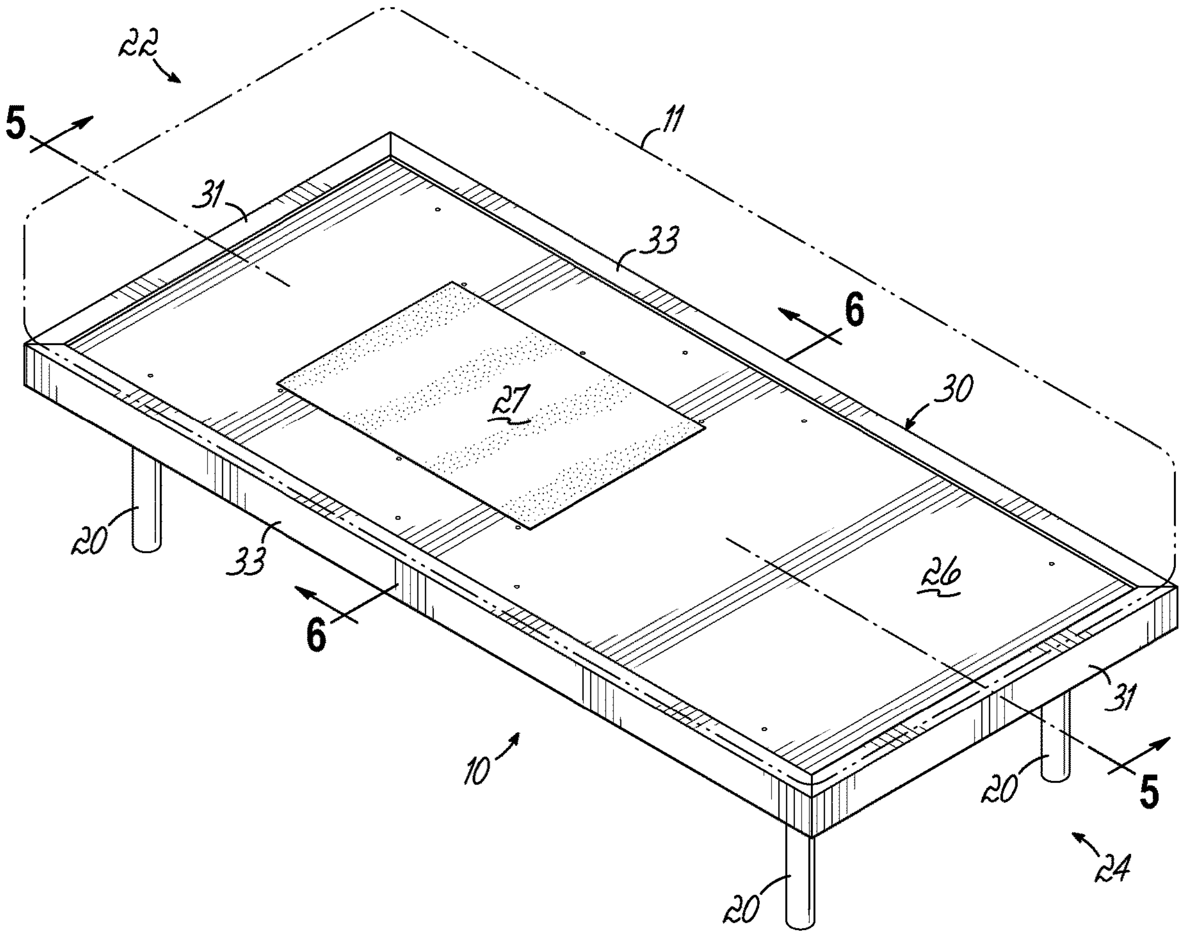
FIG. 1 is a perspective view of a bedding foundation in accordance with one embodiment of the present invention.

Referring to FIG. 1, there is illustrated a bedding foundation 10 incorporating the principles of the present invention. As seen in FIG. 1, the bedding foundation 10 is used to support a mattress 11, shown in dashed lines. Any mattress may be supported by the bedding foundation; this document is not intended to limit the type of mattress which may be supported.

Figure 2:
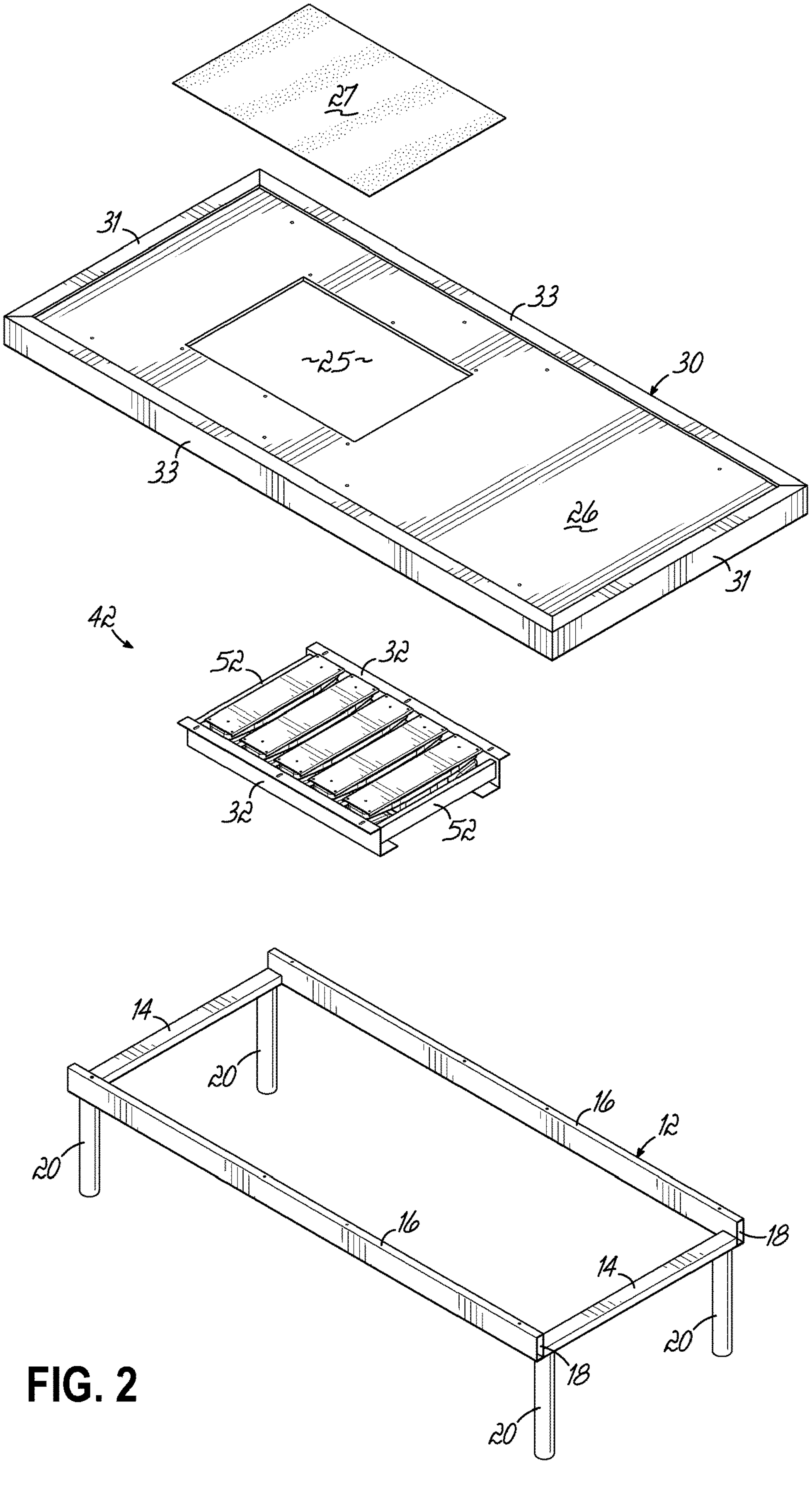
FIG. 2 is a partially disassembled view of the bedding foundation of FIG. 1.
Figure 6:
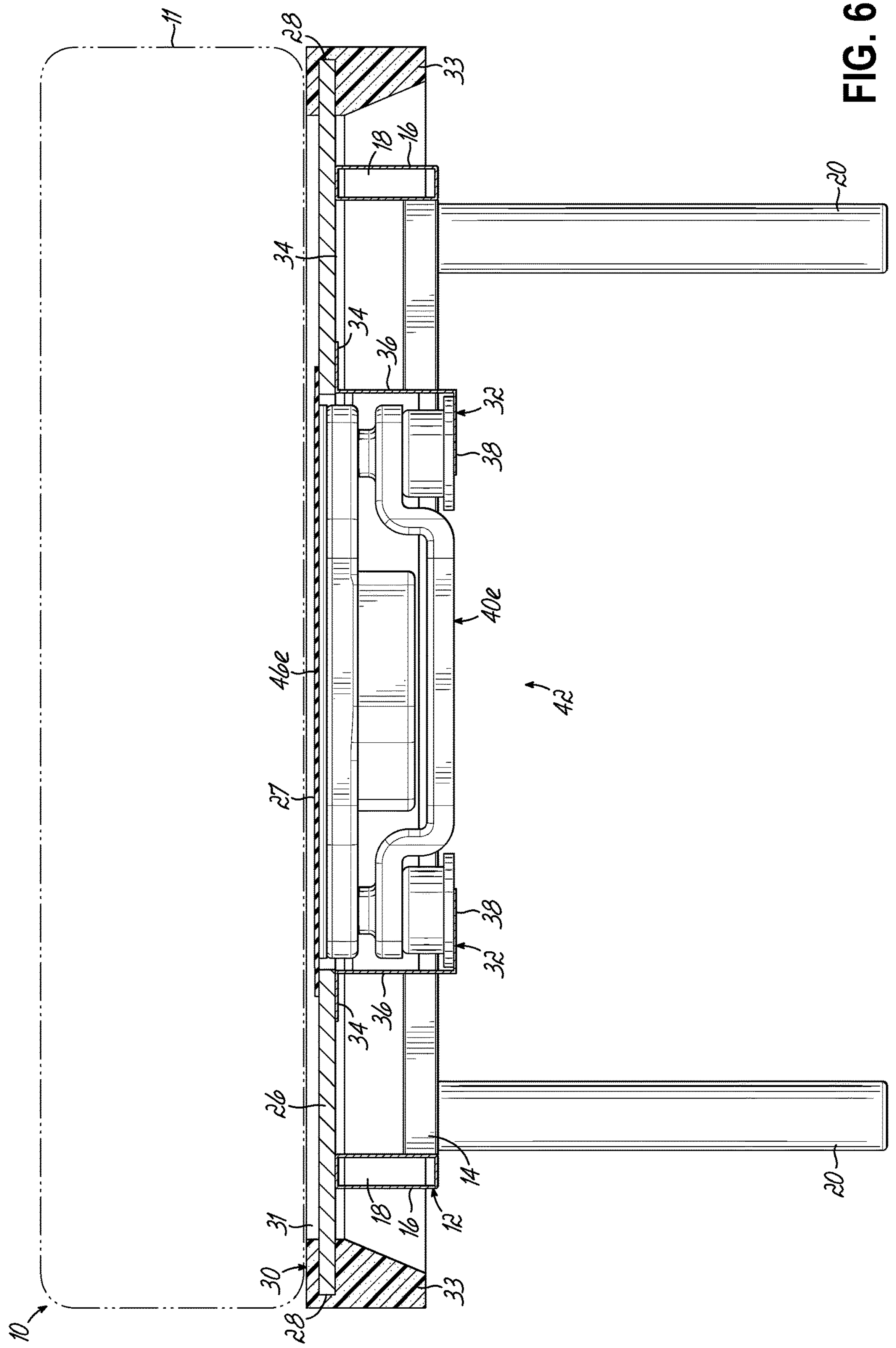
FIG. 6 is a cross sectional view taken along the line 6-6 of FIG. 1.

As best shown in FIG. 2, the bedding foundation 10 comprises a generally rectangular frame 12, comprising two end rails 14 and two side rails 16. As best shown in FIG. 2, when assembled, the end and side rails 14, 16 may be secured together with any conventional means, including fasteners. As best shown in FIGS. 2 and 6, each of the end rails 14 and each of the side rails 16 has a hollow interior 18.

Legs 20 support the rectangular frame 12 above the ground a desired distance. Although the legs 20 are illustrated being secured to the end rails 14, they may be secured to any part of the generally rectangular frame 12. Although one configuration of leg is shown, the legs may be any shape or size. The present invention is not intended to limit the legs of any embodiment shown or described herein in any manner.

For purposes of this document, the head end of the bedding foundation 10 will be indicated by the numeral 22 while the foot end of the bedding foundation 10 will be indicated by the numeral 24.

As best shown in FIG. 2, a rigid platform 26 is secured to the generally rectangular frame 12 in any known manner. The rigid platform 26 has a larger footprint than the generally rectangular frame 12 and extends outwardly from the perimeter of the generally rectangular frame 12 on all four sides. As best shown in FIG. 6, the rigid platform 26 has a perimeter edge 28 about which is placed a protective shroud 30. As best shown in FIG. 2, the protective shroud 30 comprises four pieces joined together at the corners using any known method: two end pieces 31 of the same length and two side pieces 33 of a different, greater length.

The rigid platform 26 is typically made of wood but may be made of any known material. The protective shroud 30 may be made of rubber, plastic, or any soft material. One purpose of the protective shroud 30 to protect users from contacting the perimeter edge 28 of the rigid platform 26 to prevent injuries.

Figure 5:
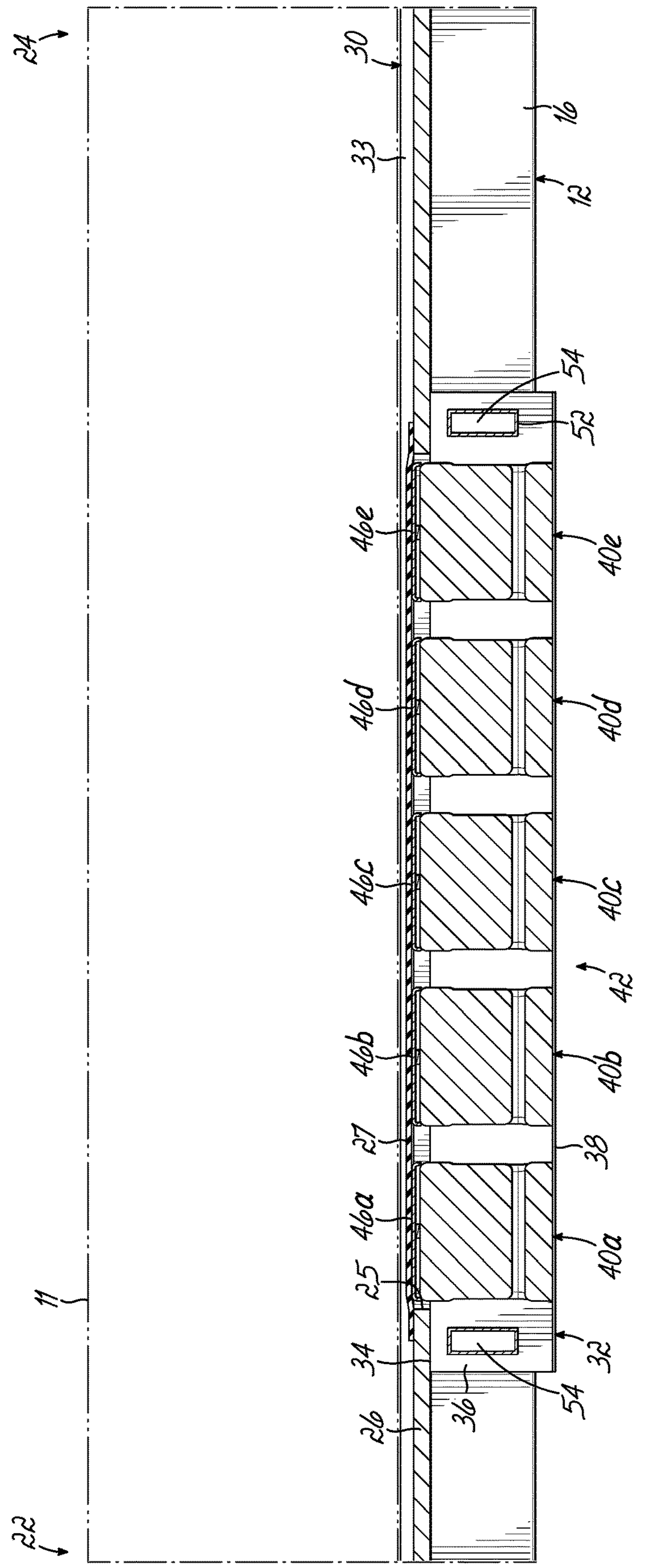
FIG. 5 is a cross sectional view taken along the line 5-5 of FIG. 1 showing the lift plates in a lowered position.
Figure 5A:
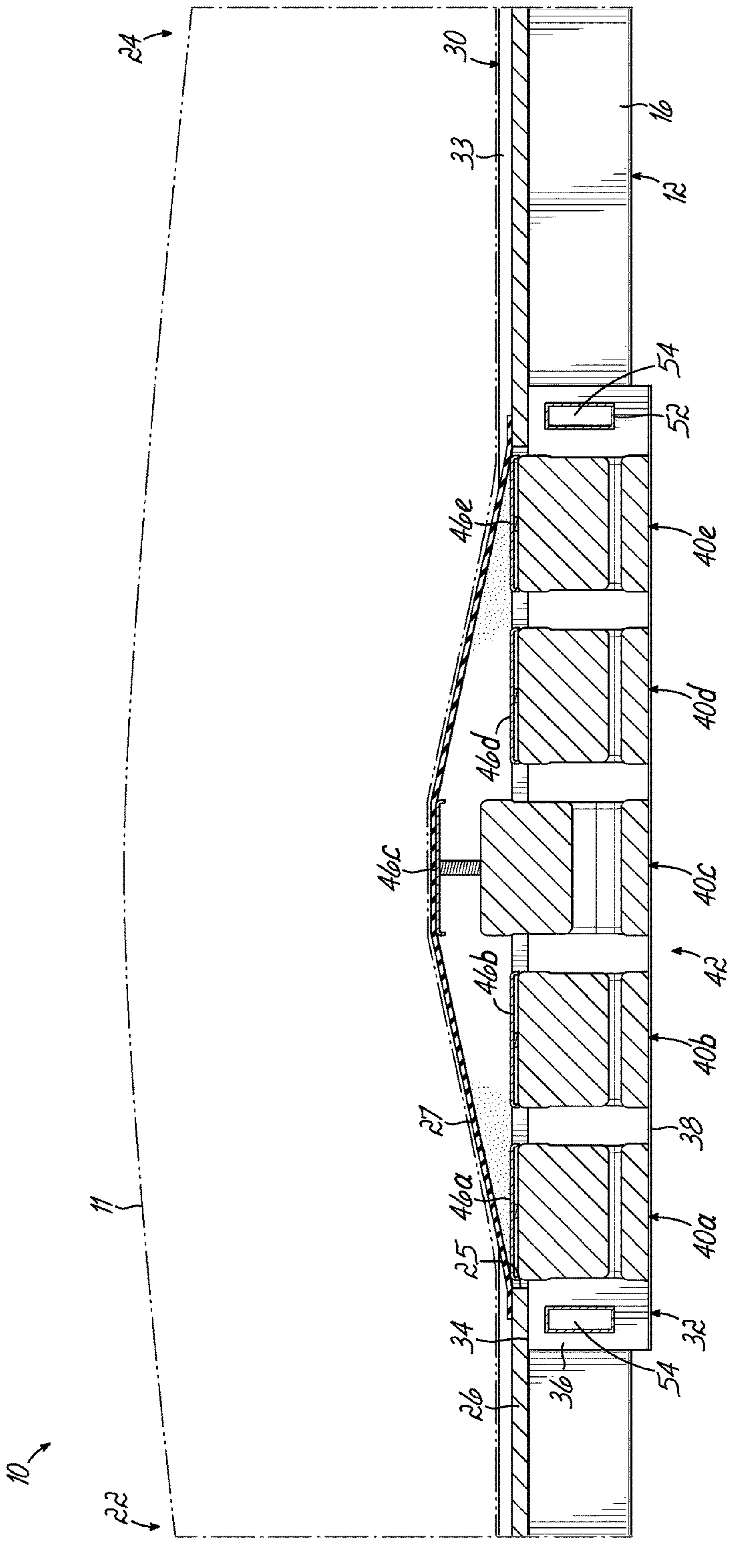
FIG. 5A is a cross sectional view like FIG. 5 showing one of the lift plates in a raised position.
Figure 5B:
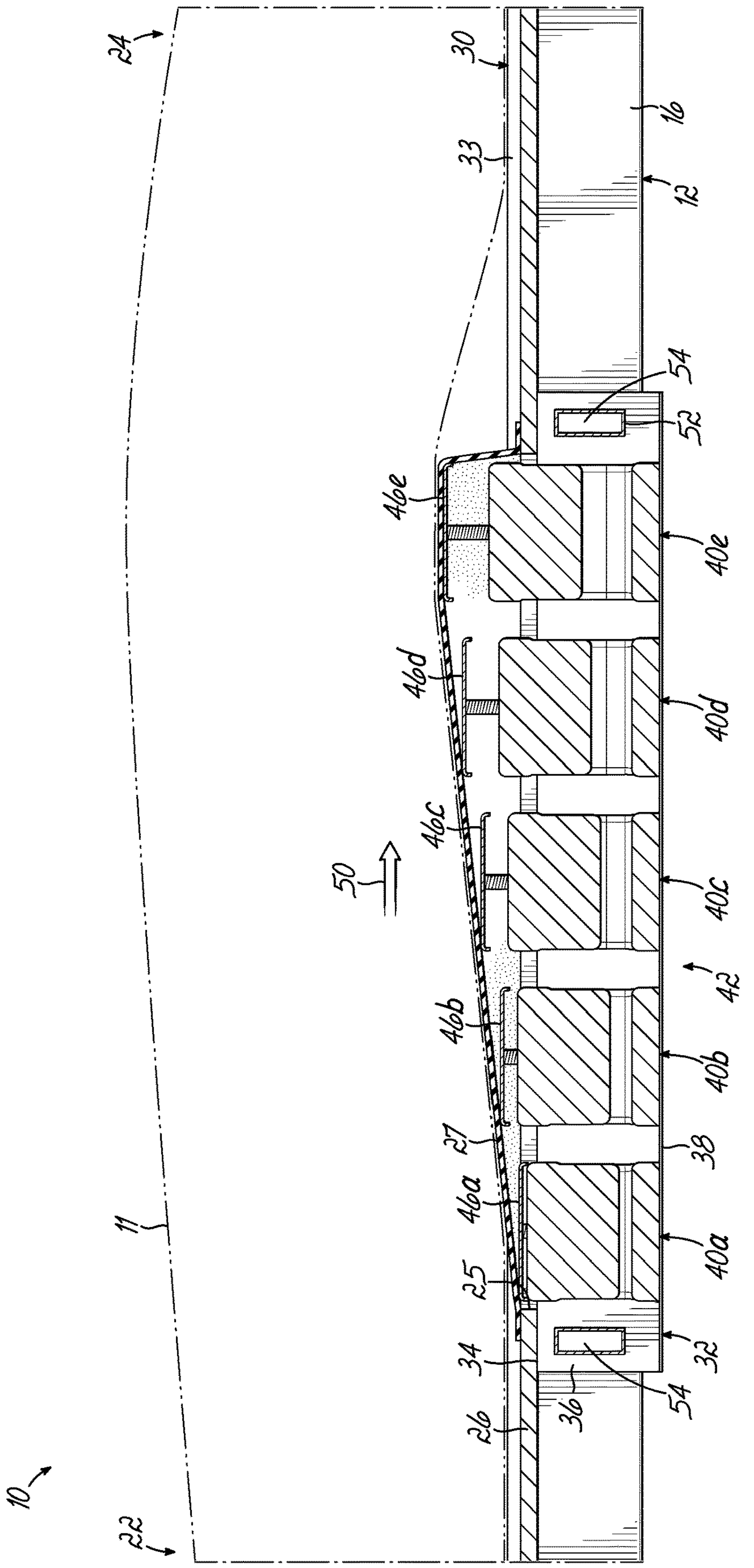
FIG. 5B is a cross sectional view like FIG. 5 showing the lift plates in different positions.
Figure 5C:
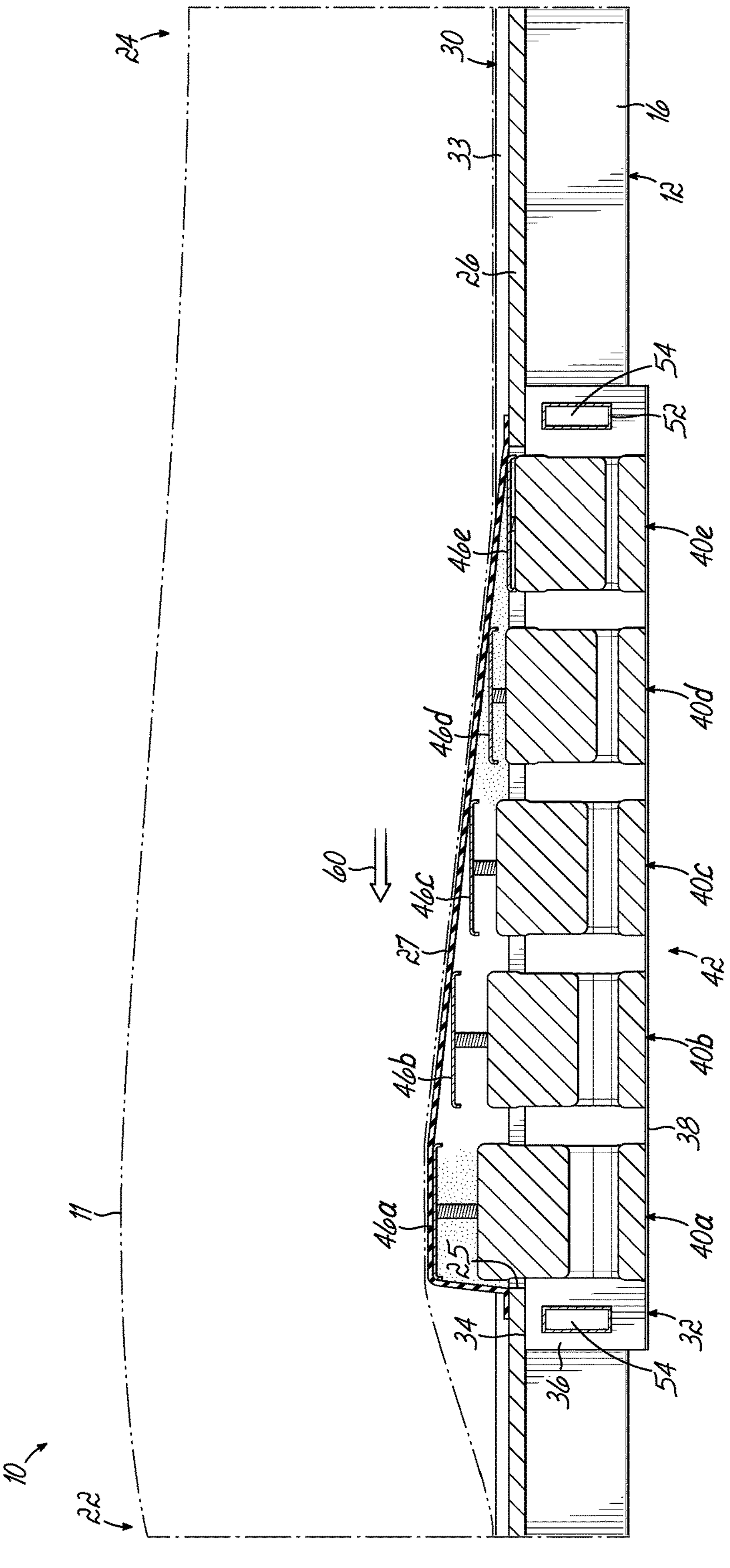
FIG. 5C is a cross sectional view like FIG. 5 showing the lift plates in other positions.

As best shown in FIG. 2, the rigid platform 26 has a rectangular opening 25 covered by a cover 27. The cover 27 may be secured to the rigid platform 26. The cover 27 may be made of any durable fabric which is elastic enough to stretch a bit as shown in FIGS. 5A-5C yet strong enough to withstand the pressure and friction caused by movement of the lift plates 46*a*-46*e*. Although the drawings illustrate a rectangular opening 25 of a certain size, the drawings are not intended to be limiting. The opening in the rigid platform may be any desired size and shape.

Figure 3:
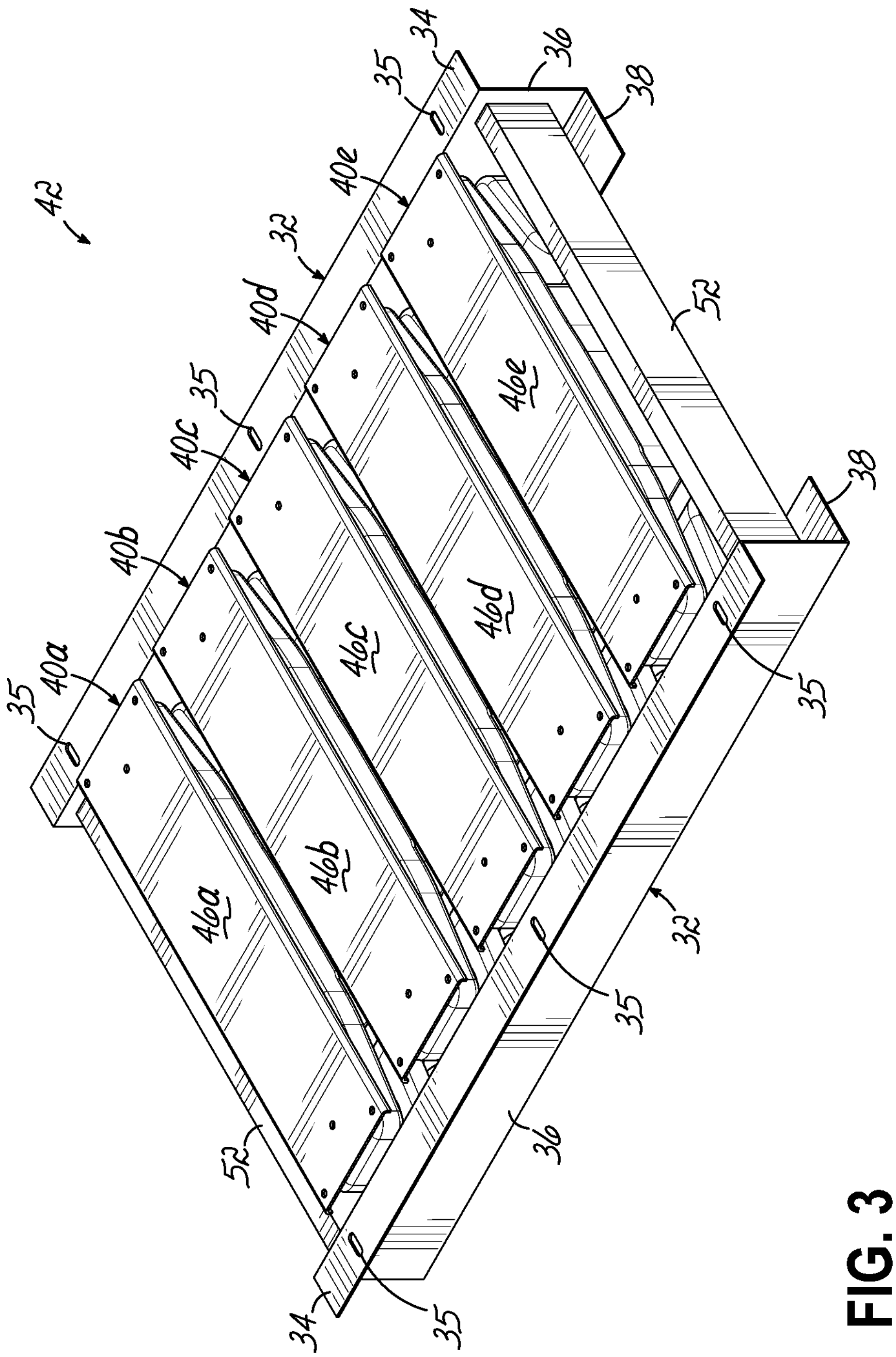
FIG. 3 is an enlarged perspective view of the lift mechanism of the bedding foundation of FIG. 1.
Figure 4:
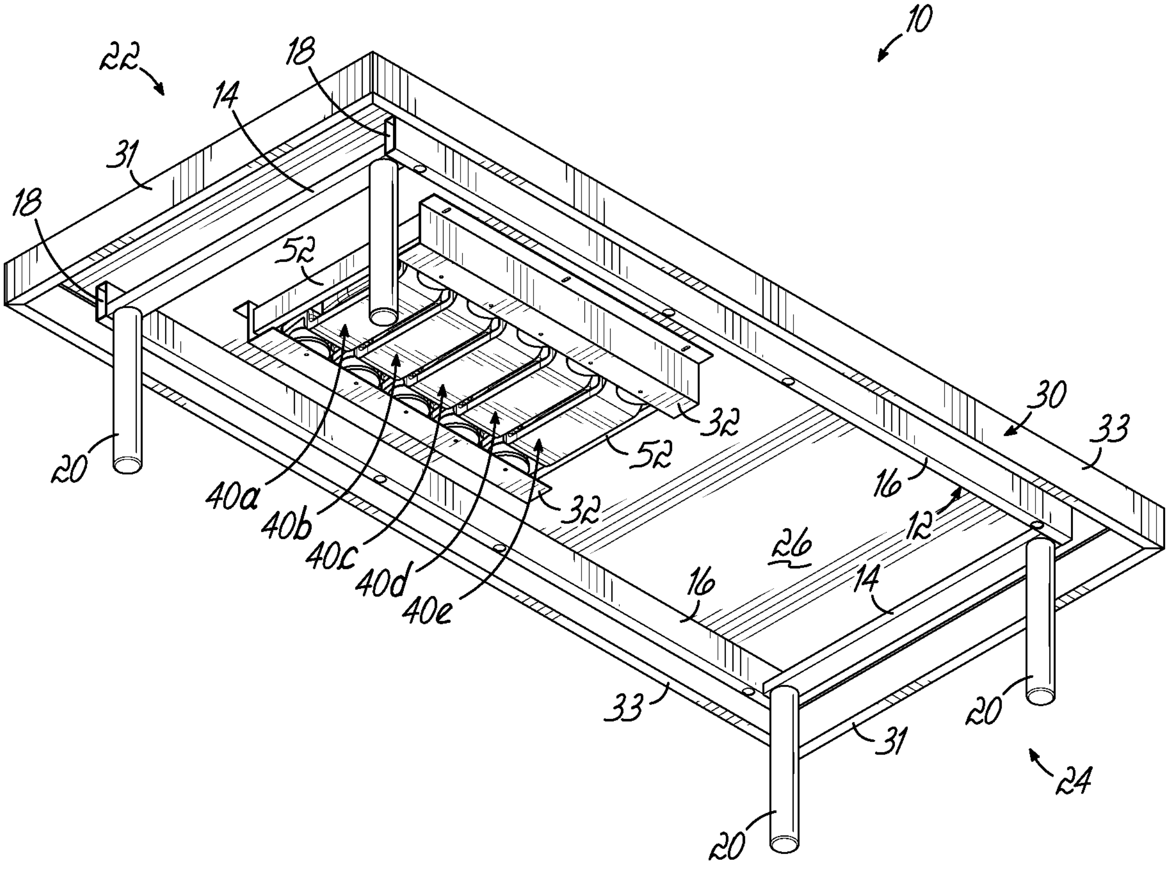
FIG. 4 is a bottom perspective view of the bedding foundation of FIG. 1.

The bedding foundation 10 further comprises a wave cassette 42 removably secured to the rigid platform 26. More particularly, the wave cassette 42 is removably secured to the rigid platform 26 using two parallel support rails 32 secured to the rigid platform 26 in any known manner including fasteners (not shown) passing through openings 35 in the support rails 32 and through the rigid platform 26. Although FIG. 3 illustrates three openings 35 per support rail 32, any number of openings of any desired shape may be used. In the event one or more of the lift actuators of the wave cassette 42 requires repair or replacement, the wave cassette 42 may be quickly and easily removed from the bedding foundation 10.

As best shown in FIG. 3, each support rail 32 is a unitary member have a horizontally oriented mounting flange 34, a connecting portion 36 extending downwardly from an inner edge of the mounting flange 34 and a lower flange 38 extending inwardly from the lower edge of the connecting portion 36. As best shown in FIG. 3, each support rail 32 is identically formed but oriented oppositely. The support rails 32 of lift mechanism 42 are oriented such that the mounting flanges 34 extend away from each other while the lower flanges 38 are extend towards each other. As shown in FIG. 6, the lower flanges 38 of each support rail 32 provides base upon which rests five lift actuators 40*a*-40*e*. Although one shape of support rail is illustrated, the support rail of the present invention may assume other shapes.

As best shown in FIG. 3, the wave cassette 42 of the bedding foundation 10 further comprises a pair of hollow stabilizers 52 welded or otherwise secured to the connecting portions 36 of the support rails 32 of the lift mechanism 42 and extending therebetween. As best shown in FIG. 5, each hollow stabilizer 52 has a hollow interior 54.

As best seen in FIG. 3, the wave cassette 42 of the bedding foundation 10 comprises five lift actuators 40*a*-40*e* between the hollow stabilizers 52. Lift actuator 40*a* is upstream of lift actuator 40*b* which is upstream of lift actuator 40*c* which is upstream of lift actuator 40*d* which is upstream of lift actuator 40*e*. As best seen in FIGS. 3 and 5, a lift plate 46*a* is part of lift actuator 40*a*, a lift plate 46*b* is part of lift actuator 40*b*, a lift plate 46*c* is part of lift actuator 40*c*, a lift plate 46*d* is part of lift actuator 40*d* and a lift plate 46*e* is part of lift actuator 40*e*. Each lift plate 46*a*, 46*b*, 46*c*, 46*d*, 46*e* is shown as being the same size and having a generally planar configuration. However, any one of the lift plates may be a different shape or size than those illustrated. Although any lift actuator may be used, one that has proven satisfactory is a Linak product Item number BASE1000A0F100100 available at http://www.linak.com. Although the drawings show the wave cassette 42 having five lift actuators, a wave cassette in accordance with the present invention may have any number of lift actuators.

FIGS. 5-5C illustrate methods of providing a massaging feeling to a mattress using a wave cassette 42 built into a bedding foundation 10. FIG. 5 illustrates all five lift plates 46*a*-46*e* in a lowered position as determined by the lift actuators 40*a*-40*e*. FIG. 5A illustrates the lift plate 46*c* in its raised or up position as determined by the lift actuator 40*c* with the other lift plates 46*a*, 46*b*, 46*d* and 46*e* being in a lowered position. Each lift plate 46*a*-46*e* is controlled by an associated lift actuator 40*a*-40*e* which may be controlled remotely (wirelessly) or via a wired connection.

FIG. 5B illustrates the lift plates 46*a*-46*e* being raised incrementally from a lowered position to a raised position as determined by the associated lift actuators 40*a*-40*e*. This movement of the lift plates 46*a*-46 creates a rearwardly directed wave type of movement in the mattress 11 above the bedding foundation 10 as indicated by arrow 50.

FIG. 5C illustrates the lift plates 46*e*-46*a* being raised incrementally from a lowered position to a raised position as determined by the associated lift actuators 40*a*-40*e*. This movement of the lift plates 46*a*-46*e* creates a forwardly directed wave type of movement in the mattress 11 above the bedding foundation 10 as indicated by arrow 60.

Figure 5D:
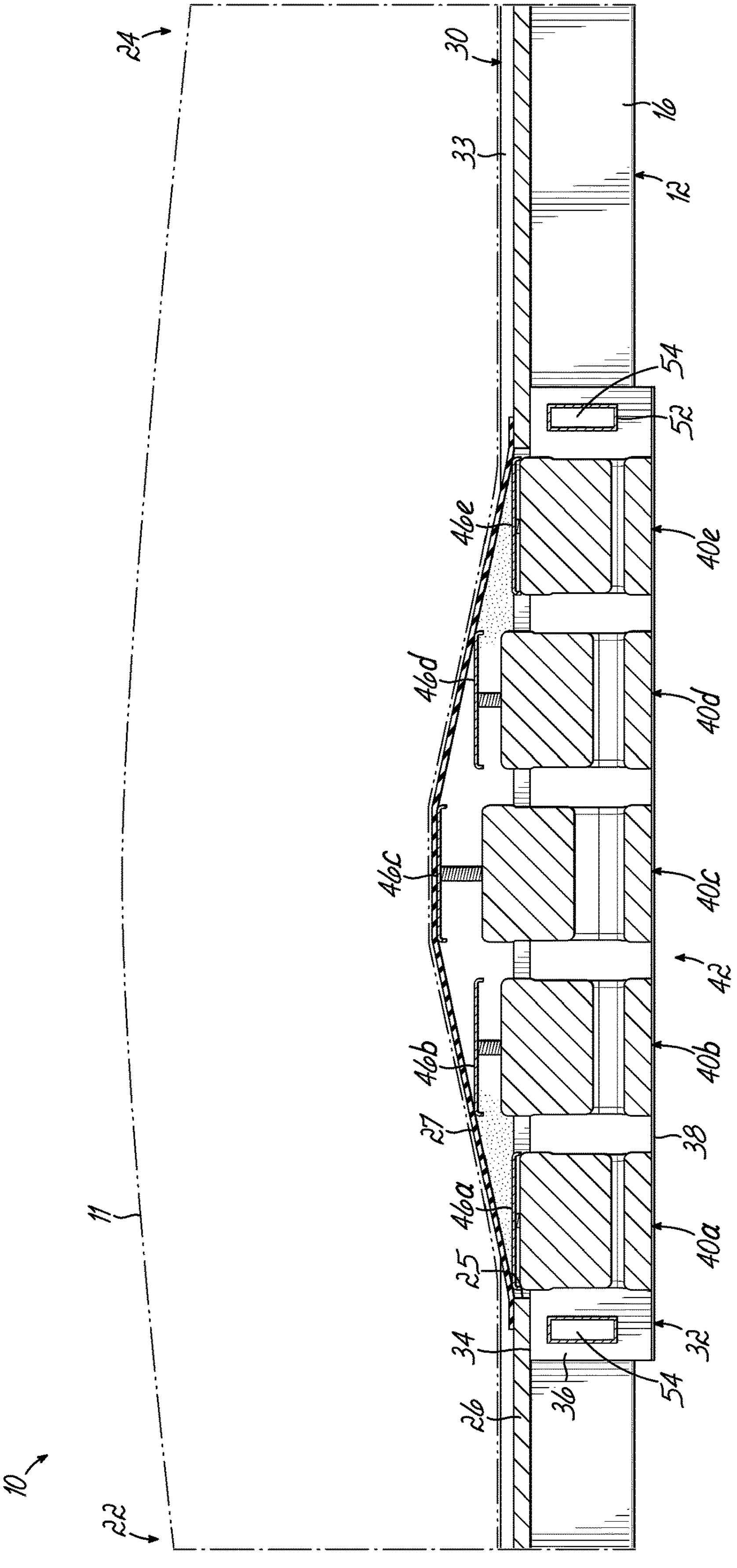
FIG. 5D is a cross sectional view like FIG. 5 showing the lift plates in other positions.

FIG. 5D illustrates the lift plates 46*e*-46*a* being in positions to create a hill shape as determined by the associated lift actuators 40*a*-40*e*. This movement of the lift plates 46*a*-46*e* creates a bump or hill in the mattress 11 above the bedding foundation 10. Lift plate 46*c* is in its raised position while lift plates 46*a* and 46*e* are each is a lowered position. Lift plates 46*b* and 46*d* are in intermediate positions.

Figure 5E:
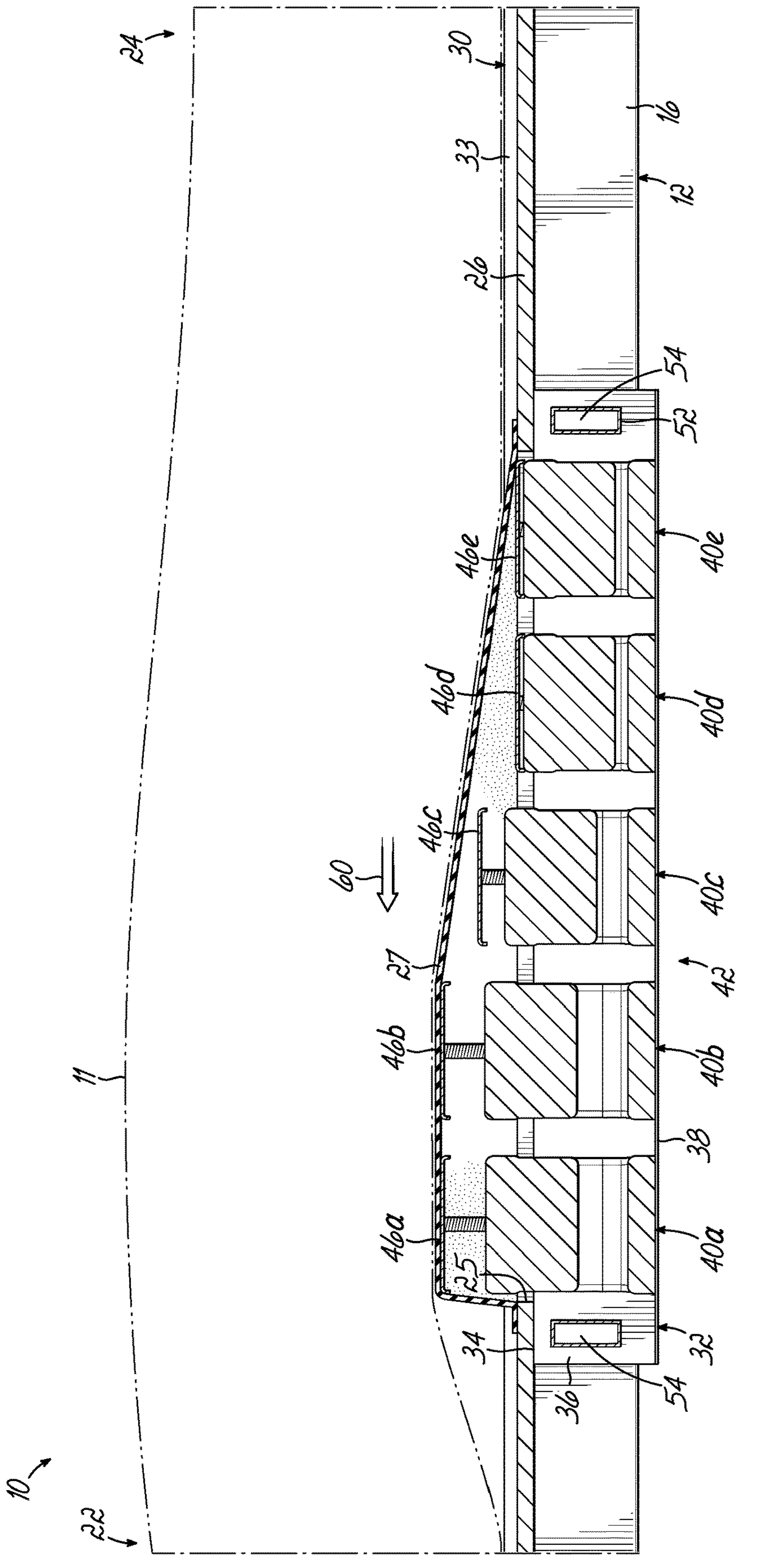
FIG. 5E is a cross sectional view like FIG. 5 showing the lift plates in other positions.

FIG. 5E illustrates the lift plates 46*e*-46*a* being in positions to create a hill shape as determined by the associated lift actuators 40*a*-40*e*. This movement of the lift plates 46*a*-46*e* creates a bump or hill in the mattress 11 above the bedding foundation 10. Lift plates 46*a* and 46*b* are each in a raised position while lift plates 46*d* and 46*e* are each in a lowered position. Lift plate 46*c* is in an intermediate position.

Although the drawings show lift plates 46*a*-46*e* in predetermined positions, those skilled in the art will appreciate that the lifts plates 46*a*-46*e* may be in any desired positions. The drawings are not intended to be limiting.

FIG. 6 illustrates a cross-section of the bedding foundation showing the details of lift actuator 40*e*. The other lift actuators 40*a*, 40*b*, 40*c* and 40*d* are identical to lift actuator 40*e*.

Figure 7:
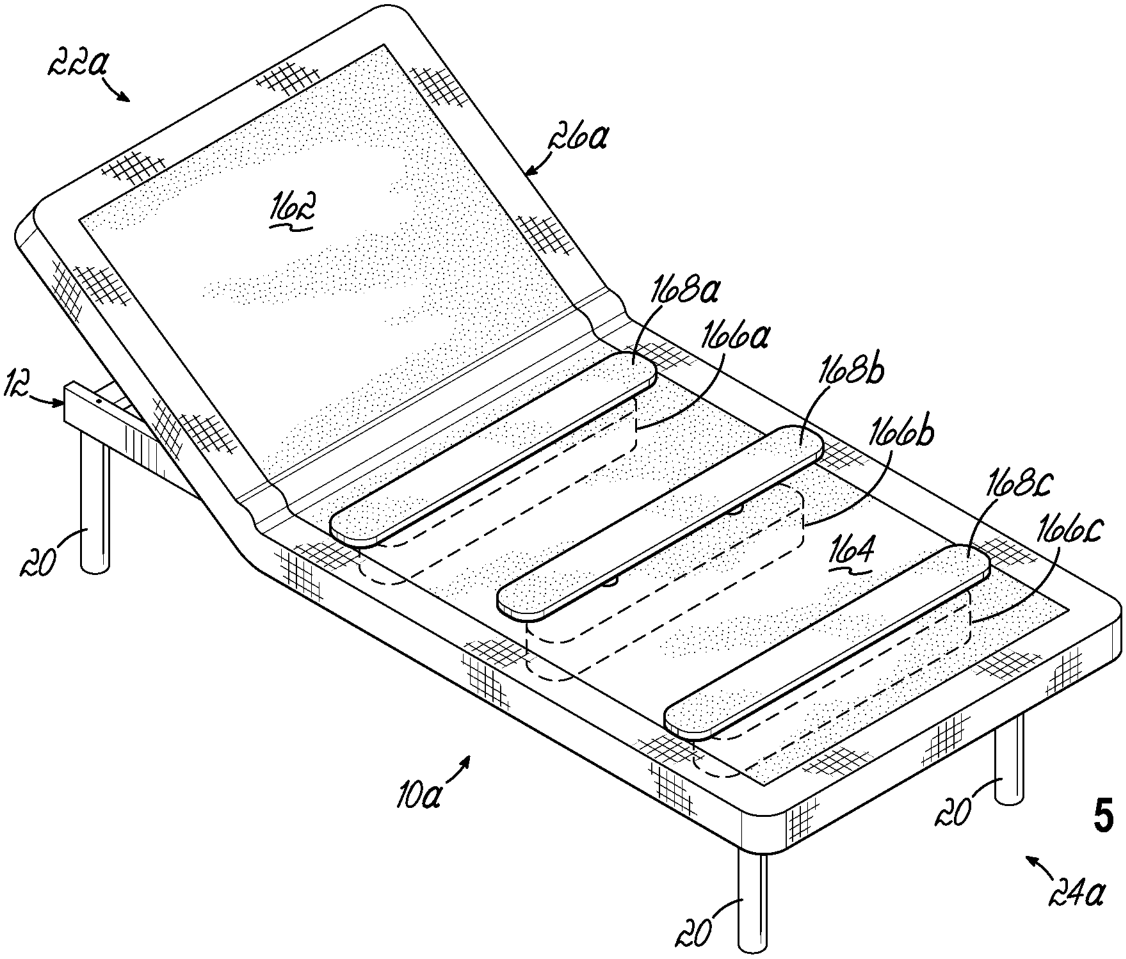
FIG. 7 is a perspective view of a bedding foundation in accordance with another embodiment of the present invention.

FIG. 7 illustrates the operation of another embodiment of bedding foundation 10*a* adapted to support a mattress (not shown) above the bedding foundation 10*a*. For purposes of this document, the head end of the bedding foundation 10*a* will be indicated by the numeral 22*a* while the foot end of the bedding foundation 10*a* will be indicated by the numeral 24*a*. Bedding foundation 10*a* comprises a generally rectangular frame 12 as described above. Legs 20 support the generally rectangular frame 12 above the ground a desired distance.

As best shown in FIG. 7, bedding foundation 10*a* has a platform 26*a* comprising an adjustable head section 162 and a stationary section 164. The adjustable head section 162 is movable between a lowered position (not shown) and a raised position shown in FIG. 7 in any known manner. The bedding foundation 10*a* further comprises three lift actuators 166*a*-166*c* secured to the stationary section 164 of the platform 26*a*. Each lift actuator 166*a*-166*c* includes a lift plate 168*a*-168*c* for exerting an upward force on a mattress (not shown) resting on the bedding foundation 10*a*.

Figure 8:
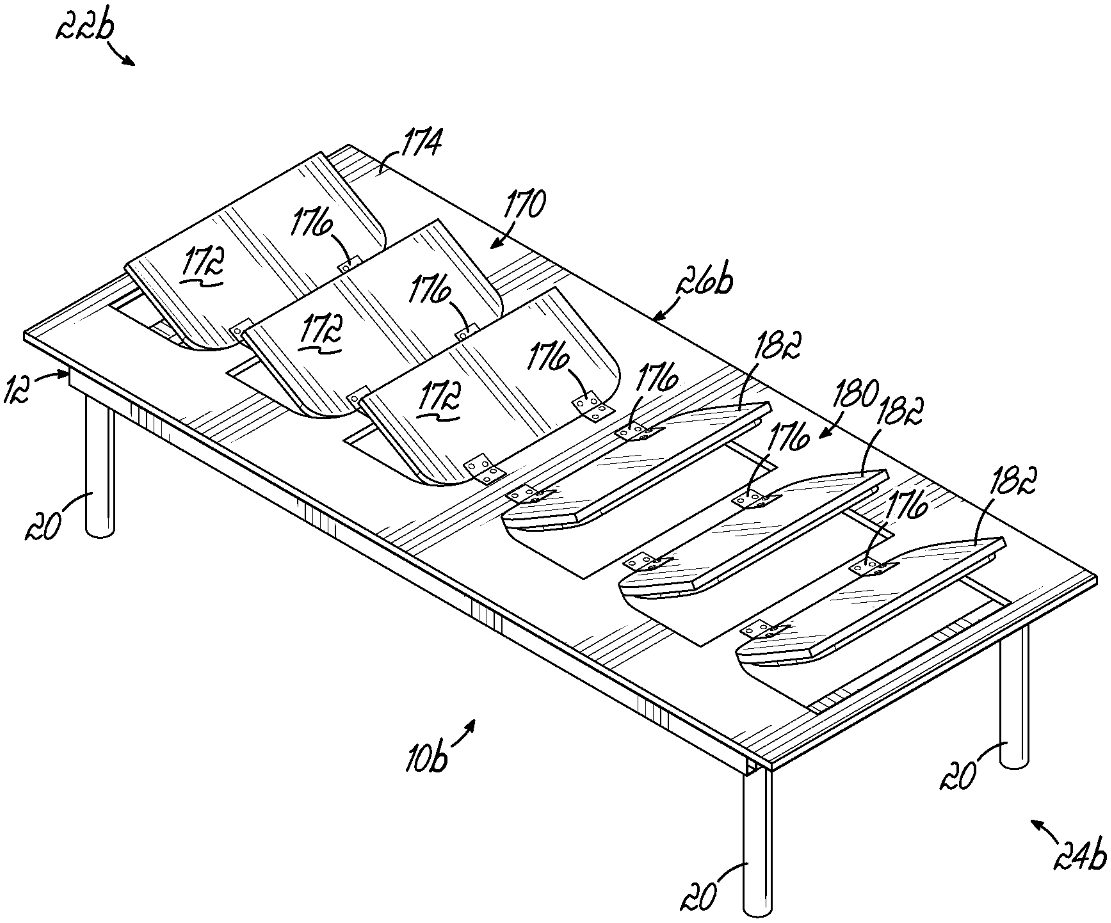
FIG. 8 is a perspective view of a bedding foundation in accordance with another embodiment of the present invention.

FIG. 8 illustrates another embodiment of bedding foundation 10*b* adapted to support a mattress (not shown) above the bedding foundation 10*b*. For purposes of this document, the head end of the bedding foundation 10*b* will be indicated by the numeral 22*b* while the foot end of the bedding foundation 10*b* will be indicated by the numeral 24*b*. Bedding foundation 10*b* comprises a generally rectangular frame 12 as described above. Legs 20 support the generally rectangular frame 12 above the ground a desired distance.

As best shown in FIG. 8, bedding foundation 10*b* has a platform 26*b* comprising a first set 170 of movable front flaps 172 hingedly secured to a stationary portion 174 of the platform 26*b* with hinges 176. Each of these front flaps 172 is movable between a raised position shown in FIG. 8 in which their front edge is above their rear edge and a lowered generally horizontal position (not shown). Although three front flaps 172 are illustrated any other number of front flaps 172 of any desired shape and size may be used to exert an upward force on a mattress (not shown) above the bedding foundation 10*b*.

As best shown in FIG. 8, the platform 26*b* of bedding foundation 10*b* further comprises a second set 180 of movable rear flaps 182 hingedly secured to a stationary portion 174 of the platform 26*b* with hinges 176. Each of these rear flaps 182 is movable between a raised position shown in FIG. 8 in which their front edge is below their front edge and a lowered generally horizontal position (not shown). Although three rear flaps 182 are illustrated any other number of rear flaps 182 of any desired shape and size may be used to exert an upward force on a mattress (not shown) above the bedding foundation 10*b*. Any known lift actuator may be used to lift one or more of the flaps simultaneously or independently.

Figure 9:
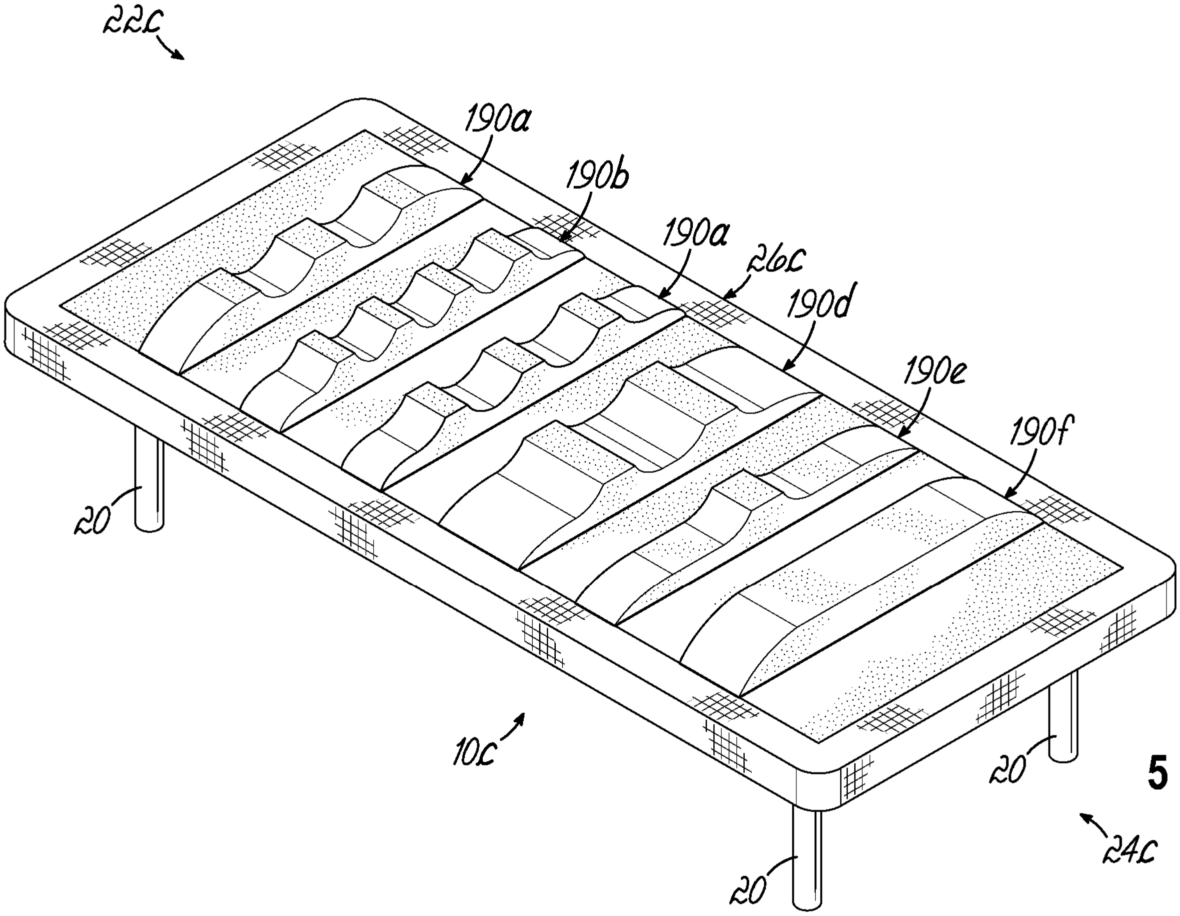
FIG. 9 is a perspective view of a bedding foundation showing different surface members which may be used in accordance with the present invention.

FIG. 9 illustrates another embodiment of bedding foundation 10*c* adapted to support a mattress (not shown) above the bedding foundation 10*c*. For purposes of this document, the head end of the bedding foundation 10*c* will be indicated by the numeral 22*c* while the foot end of the bedding foundation 10*c* will be indicated by the numeral 24*c*. Bedding foundation 10*c* comprises a generally rectangular frame 12 as described above. Legs 20 support the generally rectangular frame 12 above the ground a desired distance.

As best shown in FIG. 9, bedding foundation 10*c* has a platform 26*c* comprising a plurality of tops 190*a*-190*f*. Any one of these tops may be secured to any lift platform shown or described herein. The tops provide different feelings to a mattress when used with a lift actuator. The tops illustrated are not intended to be limiting but instead merely suggest certain ideas.

Figure 10:
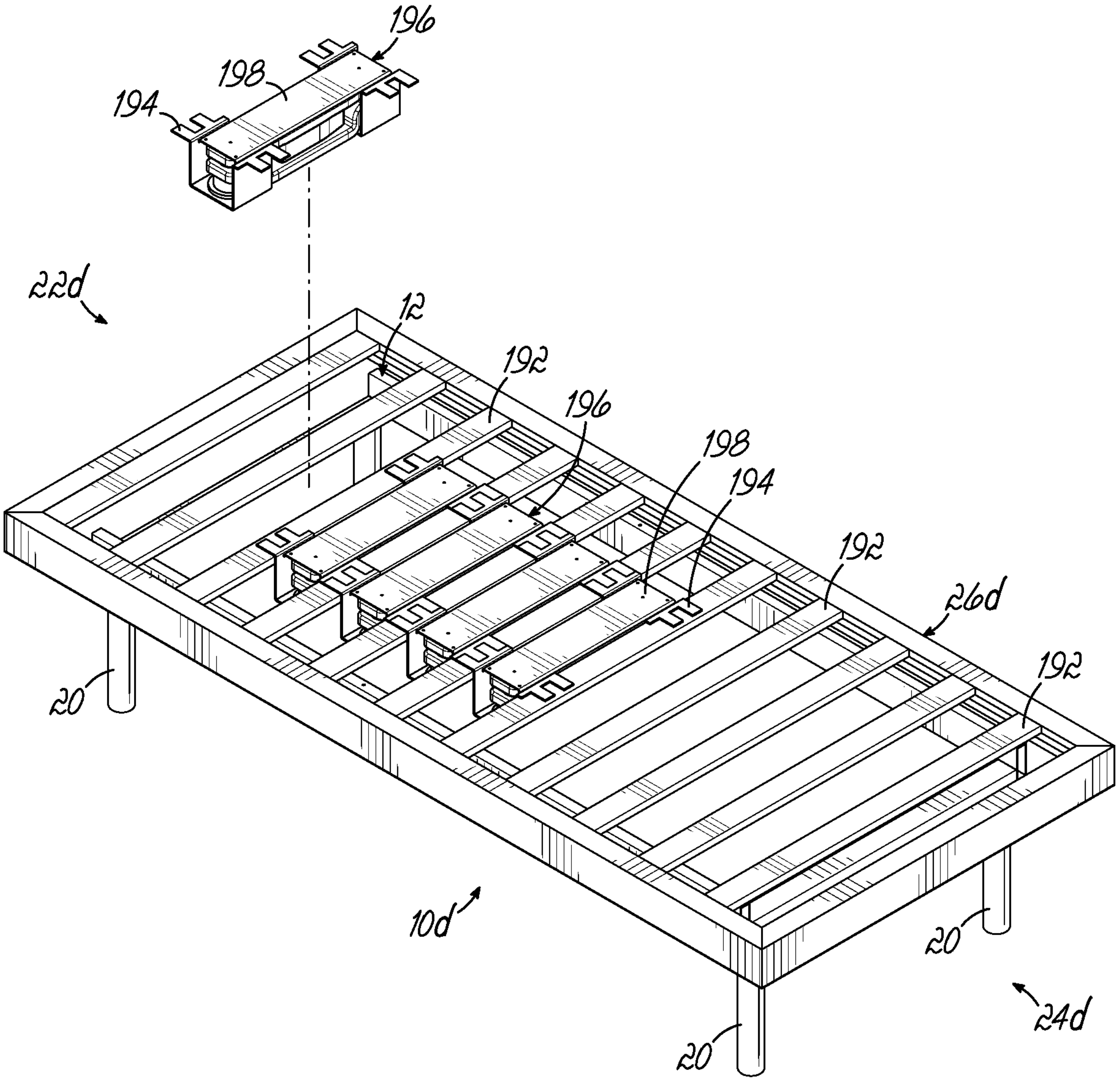
FIG. 10 is a perspective view of a bedding foundation in accordance with another embodiment of the present invention.

FIG. 10 illustrates another embodiment of bedding foundation 10*d* adapted to support a mattress (not shown) above the bedding foundation 10*d*. For purposes of this document, the head end of the bedding foundation 10*d* will be indicated by the numeral 22*d* while the foot end of the bedding foundation 10*d* will be indicated by the numeral 24*d*. Bedding foundation 10*d* comprises a generally rectangular frame 12 as described above. Legs 20 support the generally rectangular frame 12 above the ground a desired distance.

Bedding foundation 10*d* has a plurality of transversely extending slats 192. A tray 194 is located between adjacent slats 192. A lift actuator 196 having an upper platform 198 is secured in each tray 194. Although FIG. 10 illustrates five lift actuators, any number of trays 194 and lift actuators 196 may be incorporated into any bedding foundation shown or described herein. Although one configuration of tray 194 is illustrated, any other configuration of tray may be used, provided the tray is supported by the slats 192 of the bedding foundation 10*d*.

Figure 11:
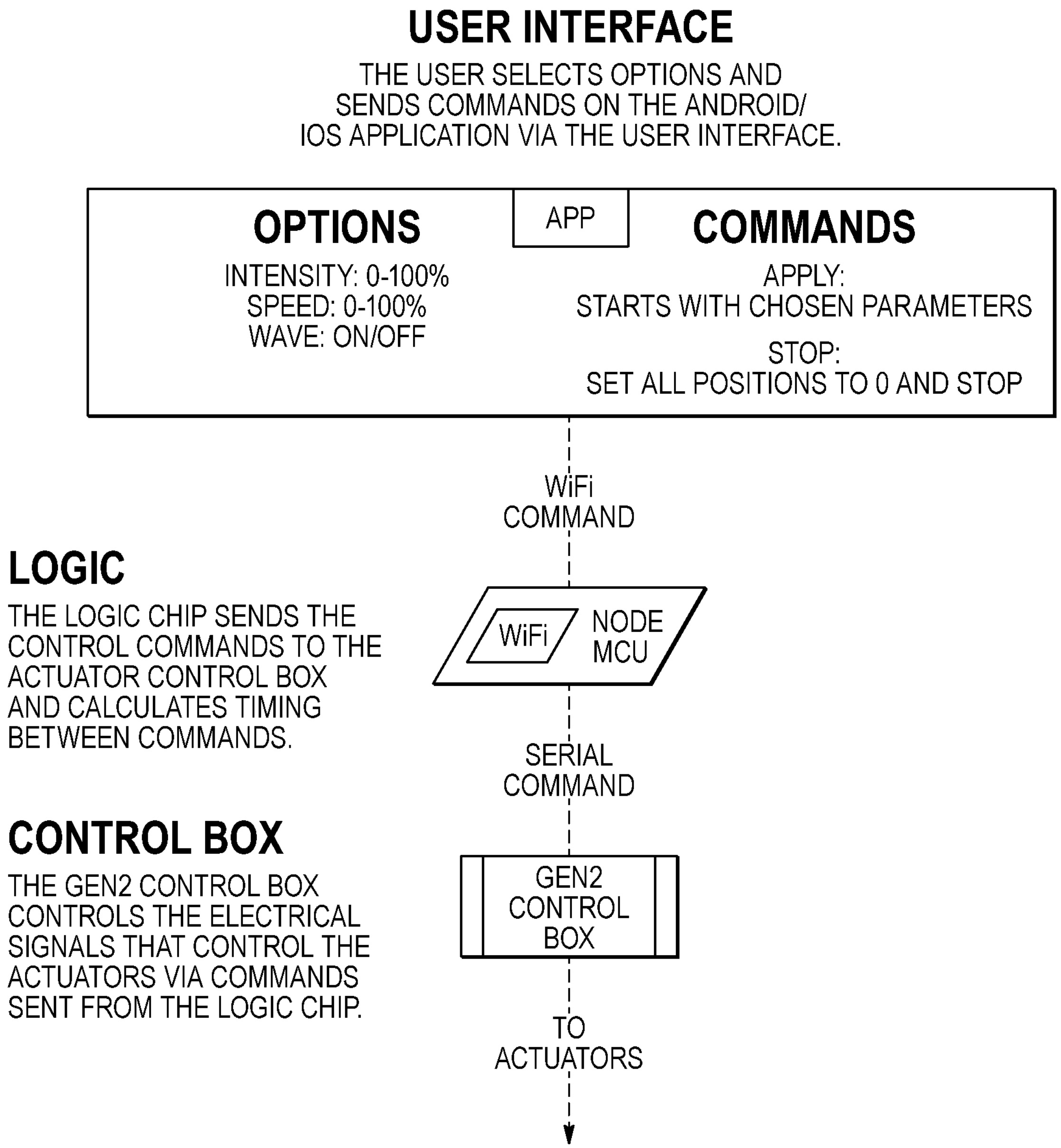
FIG. 11 is a flow chart of the operation of the bedding foundation in accordance with the present invention.

FIG. 11 is a schematic flow chart showing the operation of a bedding foundation in accordance with the present invention.

Figure 12:
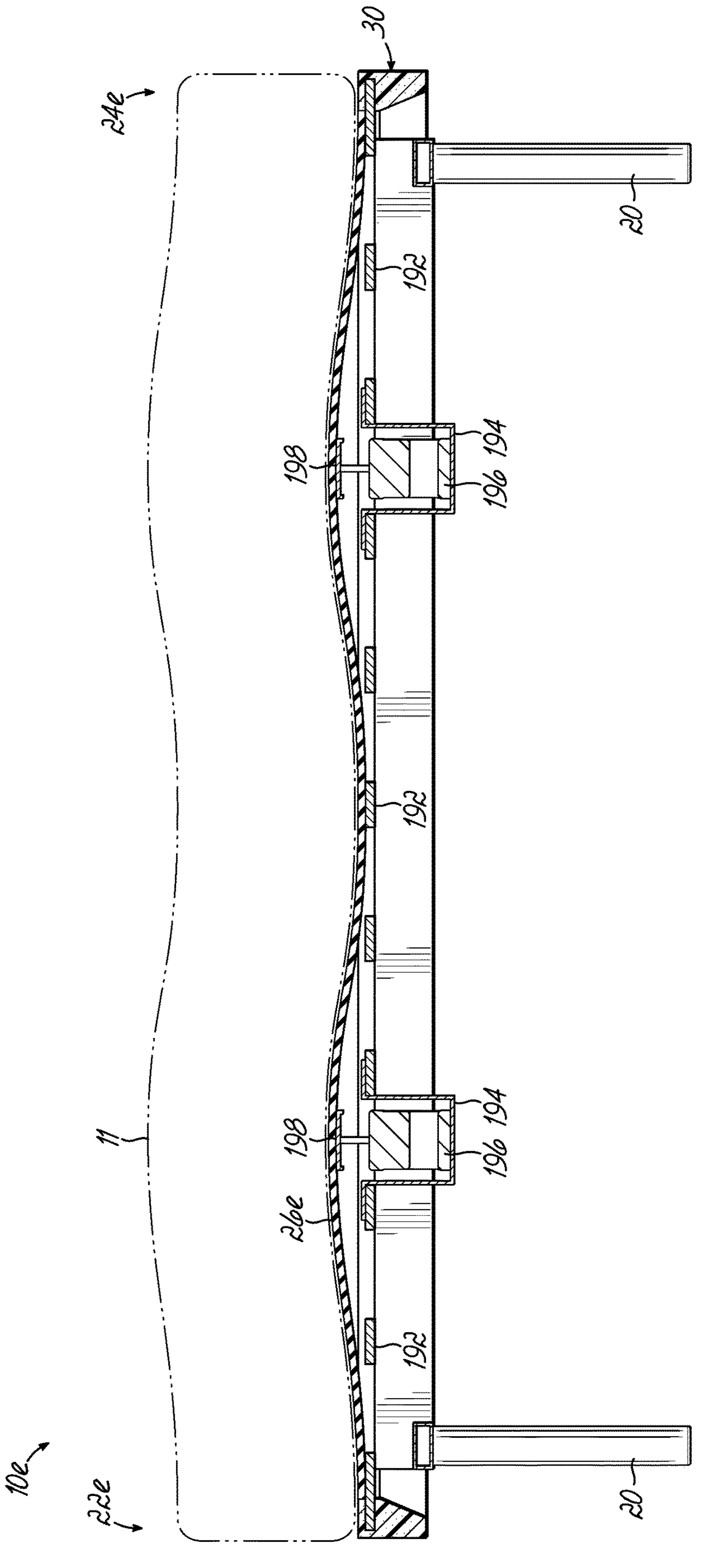
FIG. 12 is a cross-sectional view of another embodiment of bedding foundation in accordance with the present invention.

FIG. 12 illustrates the operation of another embodiment of bedding foundation 10*e* adapted to support a mattress 11 above the bedding foundation 10*e*. For purposes of this document, the head end of the bedding foundation 10*e* will be indicated by the numeral 22*e* while the foot end of the bedding foundation 10*e* will be indicated by the numeral 24*e*. Bedding foundation 10*e* comprises a generally rectangular frame 12 as described above. Legs 20 support the generally rectangular frame 12 above the ground a desired distance.

As best shown in FIG. 12, bedding foundation 10*e* has a pliable or flexible platform 26*e* unlike the rigid platform 26 described herein. The pliable or flexible platform 26*e* preferably has no openings or cutouts therein. However, a pliable or flexible platform having one or more opening or slits may be used in a foundation like foundation 10*e* or any other foundation shown or described herein. The bedding foundation 10*e* further comprises a plurality of transversely extending slats 192, like foundation 10*d* shown in FIG. 10. A tray 194 is located between adjacent slats 192. A lift actuator 196 having an upper platform 198 is secured in each tray 194. Although FIG. 12 illustrates two lift actuators, any number of trays 194 and lift actuators 196 may be incorporated into foundation 10*e* or any other bedding foundation shown or described herein. Although one configuration of tray 194 is illustrated, any other configuration of tray may be used, provided the tray is supported by the slats 192 of the bedding foundation 10*e*. The use of a pliable or flexible platform may be used in connection with any concept described or shown herein.

Figure 13:
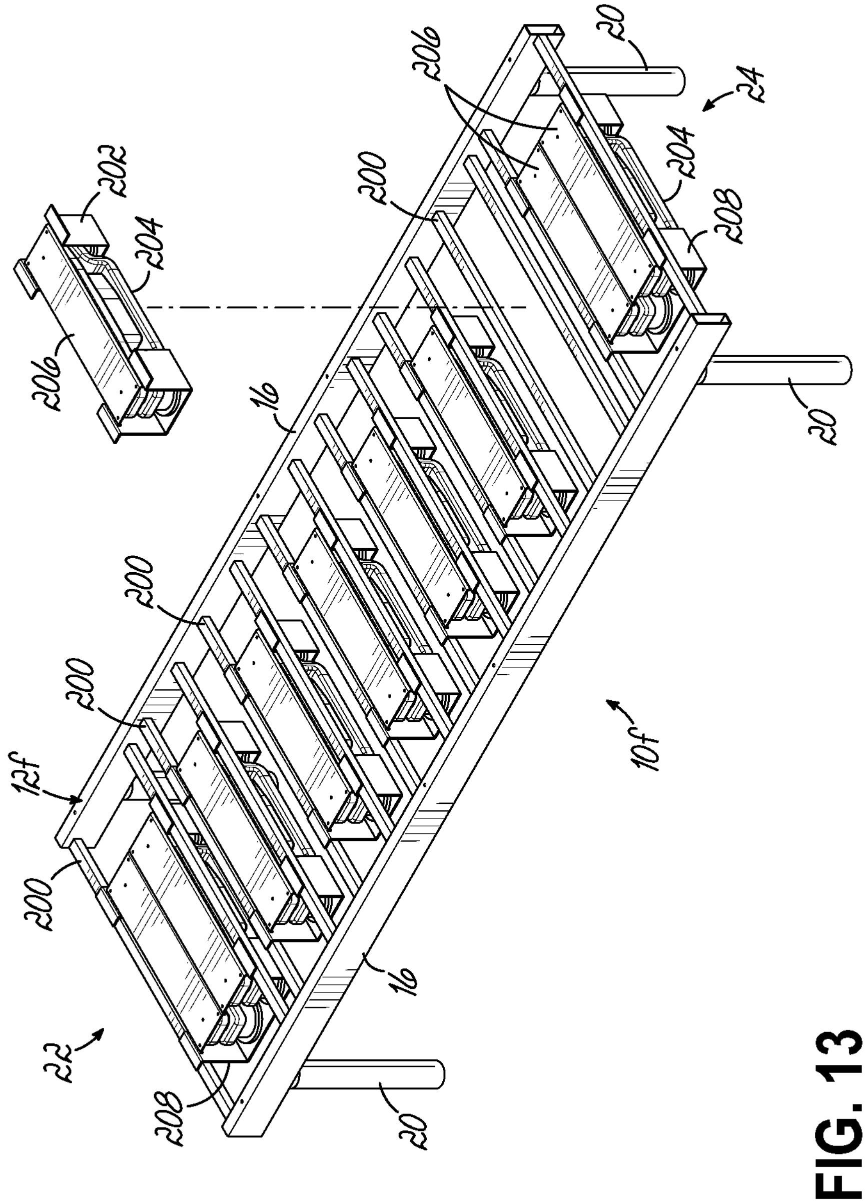
FIG. 13 is a perspective view of another embodiment of bedding foundation showing one of the internal trays raised for clarity.

FIG. 13 illustrates another embodiment of bedding foundation 10*f* adapted to support a mattress (not shown) above the bedding foundation 10*f*. For purposes of this document, the head end of the bedding foundation 10*f* will be indicated by the numeral 22 while the foot end of the bedding foundation 10*f* will be indicated by the numeral 24. Bedding foundation 10*f* comprises a generally rectangular frame 12*f* comprising side rails 16 and slats 200 extending between the side rails 16. Legs 20 support the generally rectangular frame 12*f* above the ground a desired distance.

The transversely extending slats 200 of bedding foundation 10*f* are strategically located to support two external trays 208 and six internal trays 202 between the external trays 208. The trays 208, 202 are spaced along the full length of the bedding foundation 10*f*. Each of the trays 208, 202 is supported or suspended by two adjacent slats 200. A lift actuator 204 having a lift plate 206 is secured in each internal tray 202. At each end of the bedding foundation 10*f*, an external tray 208 is suspended between adjacent slats 200. The external tray 208 is wider than the internal tray 202 to receive two lift actuators 204. Two lift actuators 204, each having a lift plate 206, are secured in each external tray 208.

Although FIG. 13 illustrates ten lift actuators 204 located in two external trays 208 and six internal trays 202, any number of lift actuators 204 may be incorporated into any number of trays in bedding foundation 10*f* shown or described herein. Although one configuration of internal tray 204 is illustrated, any other configuration of internal tray may be used, provided the internal tray is supported by the slats 200 of the bedding foundation 10*f*. Although one configuration of external tray 208 is illustrated, any other configuration of external tray may be used, provided the external tray is supported or suspended by the slats 200 of the bedding foundation 10*f*. Although one configuration of slat 200 is shown and described, the slats may be other sizes or configurations.

Figure 13A:
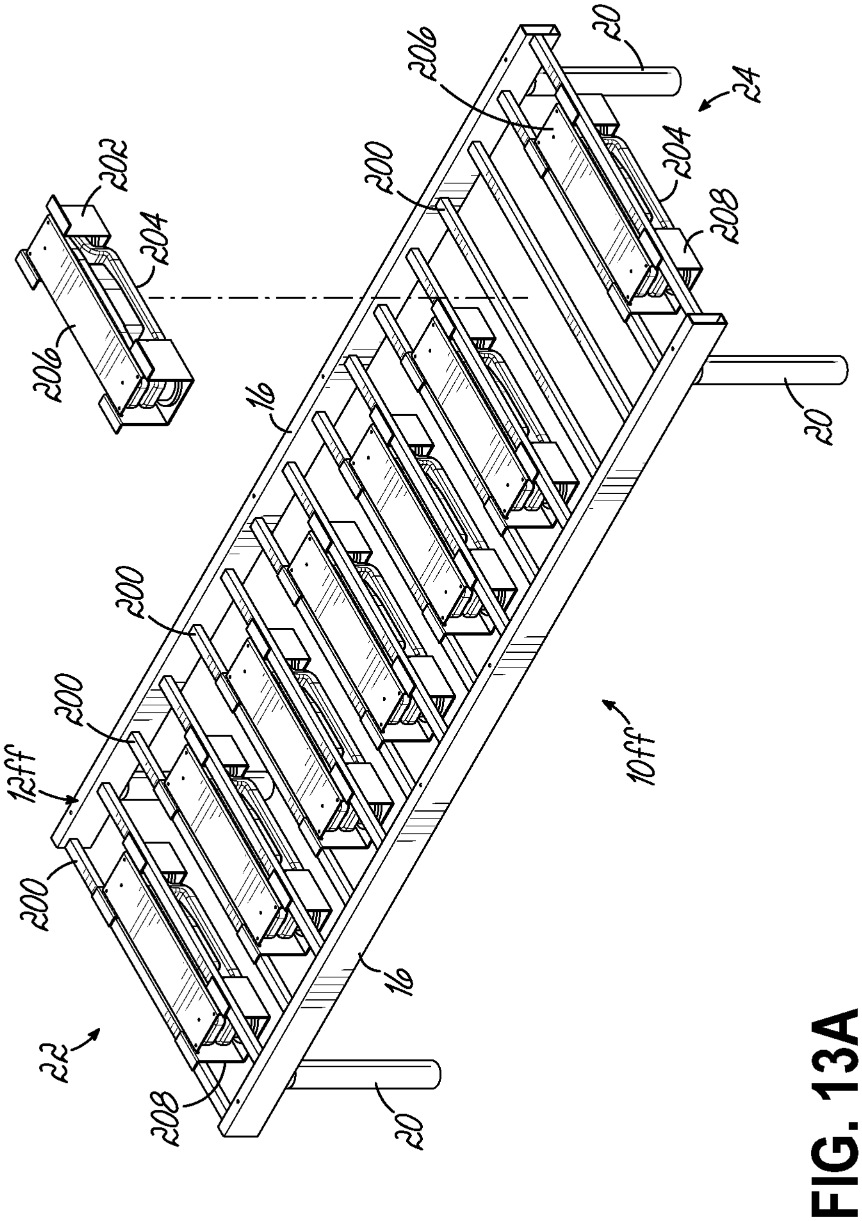
FIG. 13A is a perspective view of another embodiment of bedding foundation like FIG. 13 showing one of the trays raised for clarity.

FIG. 13A illustrates another embodiment of bedding foundation 10*ff* adapted to support a mattress (not shown) above the bedding foundation 10*ff*. For purposes of this document, the head end of the bedding foundation 10*ff* will be indicated by the numeral 22 while the foot end of the bedding foundation 10*ff* will be indicated by the numeral 24. Bedding foundation 10*ff* comprises a generally rectangular frame 12*ff*, similar to frame 12*f*, but having slats 200 at different locations than does frame 12*f*. Legs 20 support the generally rectangular frame 12*ff* above the ground a desired distance.

The transversely extending slats 200 of bedding foundation 10*ff* are strategically located at different locations than the transversely extending slats 200 of bedding foundation 10*f* because bedding foundation 10*ff* has no external trays 208. Instead, the bedding foundation 10*ff* has eight internal trays 202 evenly spaced along the length of the bedding foundation 10*ff*. Although FIG. 13A shows eight internal trays 202 evenly spaced along the length of the bedding foundation 10*ff*, any number of trays of any desired size may be suspended by the transversely extending slats 200 of bedding foundation.

Figure 14:
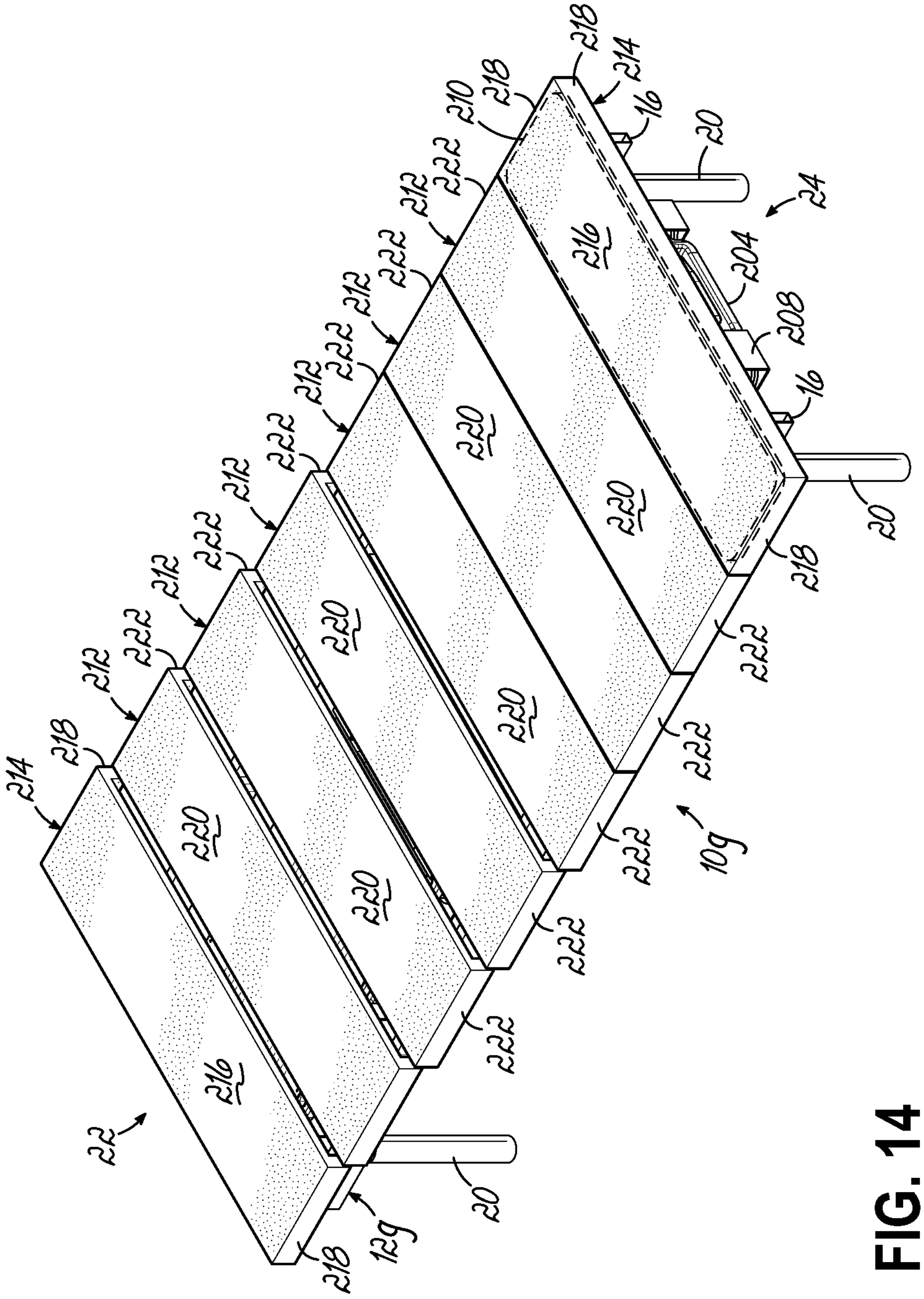
FIG. 14 is a perspective view of another embodiment of bedding foundation showing foam covers over support plates of the foundation.
Figure 15:
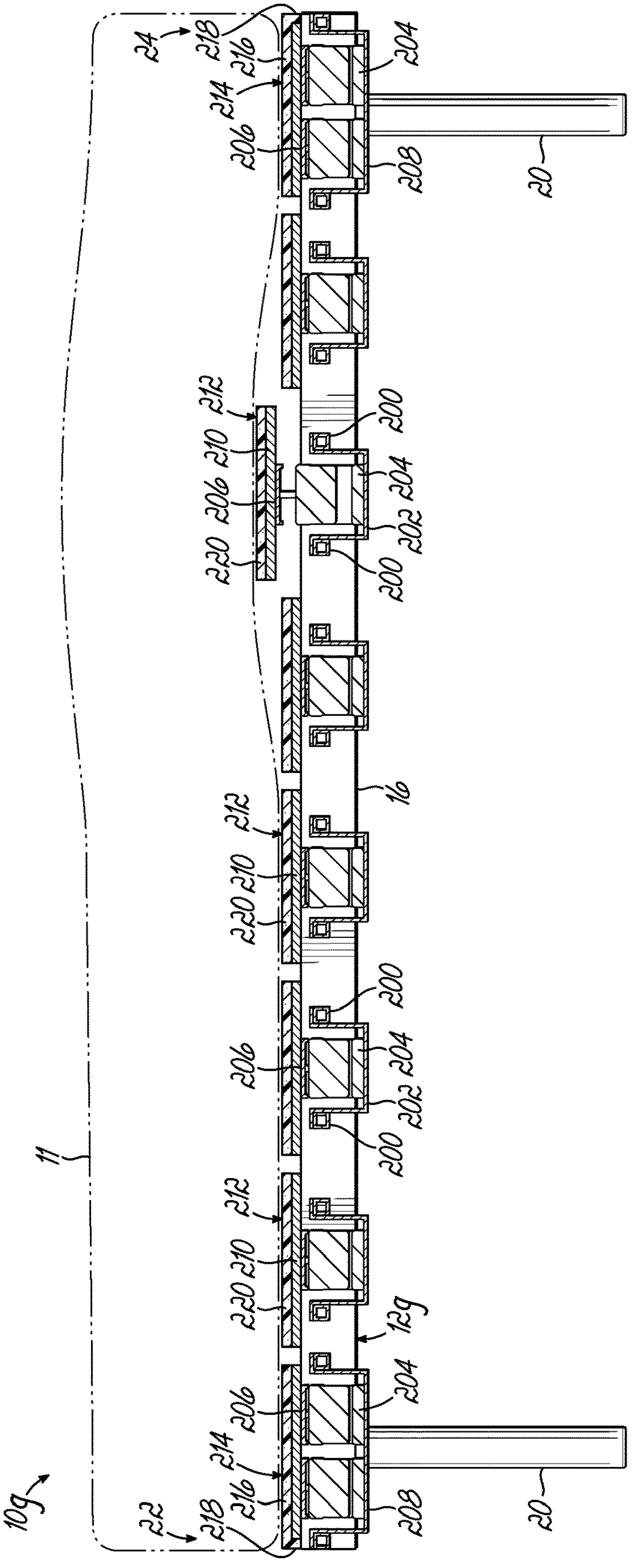
FIG. 15 is a cross-sectional view of the bedding foundation of FIG. 14 but with all but one of the lift plates lowered.

FIGS. 14 and 15 illustrate another embodiment of bedding foundation 10*g* adapted to support a mattress (not shown) above the bedding foundation 10*g*. For purposes of this document, the head end of the bedding foundation 10*g* will be indicated by the numeral 22 while the foot end of the bedding foundation 10*g* will be indicated by the numeral 24. Bedding foundation 10*g* comprises a generally rectangular frame 12*g*, legs 20, external trays 208, internal trays 202 and lift actuators 204 shown in FIG. 15. However, as best shown in FIG. 15, a support plate 210 is secured to the two lift plates 206 of the adjacent lift actuators 204 located in each external tray 208. The same size support plate 210 is secured to each of the lift plates 206 of the lift actuators 204 located in each of the internal trays 202. Although the drawings show one size and configuration of support plate 210, the drawings are not intended to be limiting. For example, each of the support plates 210 may have a dimpled or otherwise uneven upper surface.

As best shown in FIGS. 14 and 15, each of the support plates 210 may be at least partially surrounded with either an inner cushion 212 or an outer cushion 214. Each of the two outer cushions 214 comprises an upper portion 216 and leg portions 218 extending downwardly from the upper portion 216 on three sides. Each of the six inner cushions 212 comprises an upper portion 220 and leg portions 222 extending downwardly from the upper portion 220 on opposite sides. The inner and outer cushions 212, 214 are preferably made of foam but may be made of at least partially of fiber or any other known cushioning material.

As seen in FIG. 15, the bedding foundation 10*g* is used to support a mattress 11, shown in dashed lines. Any mattress may be supported by the bedding foundation; this document is not intended to limit the type of mattress which may be supported.

Figure 16:
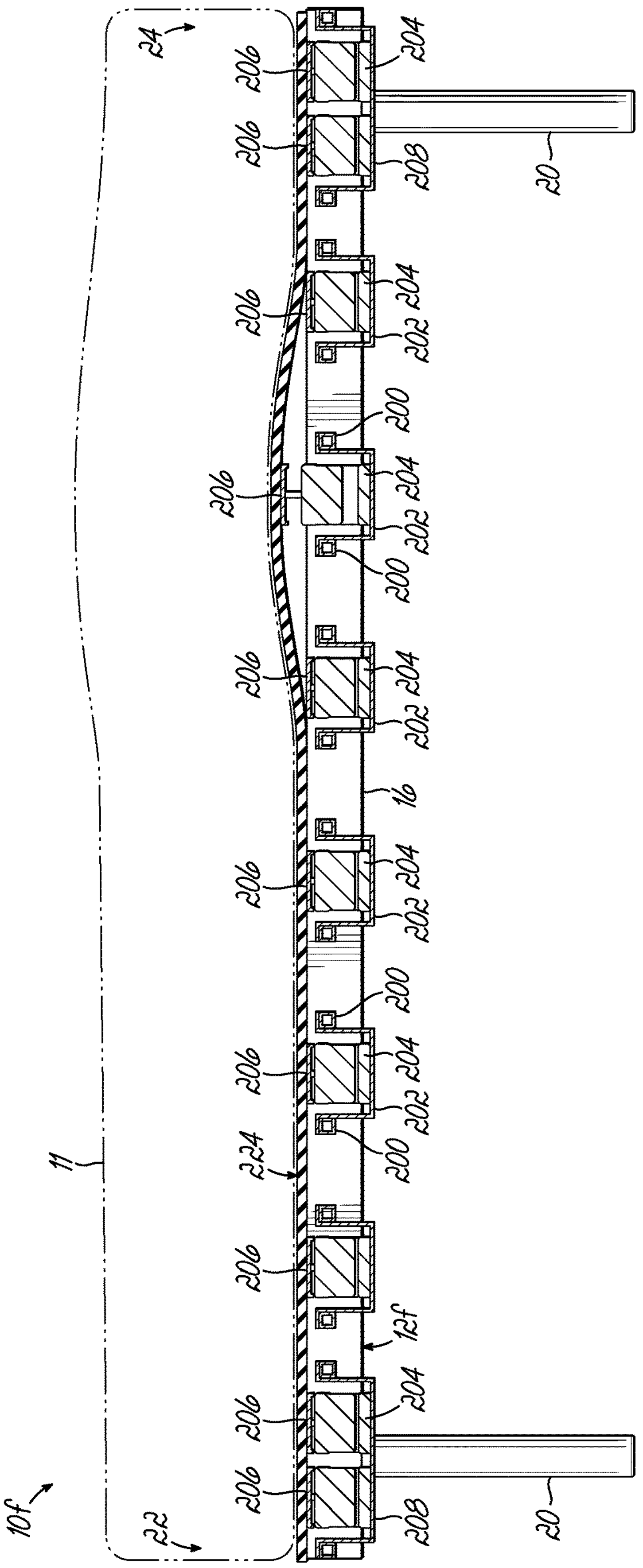
FIG. 16 is a cross-sectional view of another embodiment of bedding foundation showing one of the lift plates raised.

FIG. 16 illustrates a cross-sectional view of the bedding foundation 10*f* but adding a unitary cushion pad 224 located above the lift plates 206 of lift actuators 204. The cushion pad 224 is shown as extending the full length of the bedding foundation 10*f*. Although not clearly shown, the cushion pad 224 may extend the full width of the bedding foundation 10*f*. Such a cushion pad 224 may be used in any of the embodiments shown or described herein.

As seen in FIG. 16, the bedding foundation 10*f* is used to support a mattress 11, shown in dashed lines. Any mattress may be supported by the bedding foundation; this document is not intended to limit the type of mattress which may be supported.

The various embodiments of the invention shown and described are merely for illustrative purposes only, as the drawings and the description are not intended to restrict or limit in any way the scope of the claims. Those skilled in the art will appreciate various changes, modifications, and improvements which can be made to the invention without departing from the spirit or scope thereof. The invention in its broader aspects is therefore not limited to the specific details and representative apparatus and methods shown and described. Departures may therefore be made from such details without departing from the spirit or scope of the general inventive concept. For example, the roller concept of the present invention may be used in an adjustable bed base. Any of the hollow members of the bedding foundation may be at least partially solid. The invention resides in each individual feature described herein, alone, and in all combinations of any and all of those features. Accordingly, the scope of the invention shall be limited only by the following claims and their equivalents.

What is claimed is:

1. A bedding foundation comprising:

a generally rectangular frame supported by legs, the generally rectangular frame including transversely extending slats;

a plurality of trays suspended by the slats, each of the trays being supported by two adjacent slats;

only one lift actuator inside each of the trays, each lift actuator raising and lowering a lift plate;

wherein said lift actuators are programmed to move the lift plates in a vertical direction in a predetermined pattern.

2. The bedding foundation of claim 1, wherein the trays are the same size.

3. The bedding foundation of claim 1, wherein the generally rectangular frame has hollow side members.

4. The bedding foundation of claim 1, wherein the foundation has at least three lift actuators.

5. The bedding foundation of claim 1, wherein the lift actuators are programmed to raise and lower the lift plates at predetermined times.

6. The bedding foundation of claim 1, wherein each of the slats extend from one side of the frame to the other side of the frame.

7. The bedding foundation of claim 6, wherein the lift plates are spaced from each other.

8. A bedding foundation comprising:

a frame supported by legs;

slats extending between hollow side rails of the frame;

trays suspended by adjacent slats, the trays being evenly spaced along the full length of the bedding foundation; and one lift actuator being secured inside each of the trays, each of the lift actuators lifting a support plate, the support plate being secured to the lift actuator, wherein each of the lift actuators is programmed to move in a vertical direction.

9. The bedding foundation of claim 8, wherein each of the support plates is approximately the same size as the tray to which it is secured.

10. The bedding foundation of claim 9, further comprising a cushion at least partially covering each of the support plates.

11. The bedding foundation of claim 10, wherein the cushion is made at least partially of foam.

12. The bedding foundation of claim 9, wherein the lift actuators are programmed to raise and lower the support plates at predetermined times.

13. The bedding foundation of claim 9, wherein the support plates are the same size.

14. The bedding foundation of claim 13, wherein the support plates are rectangular.

15. A method of providing a massaging feeling to a mattress from a bedding foundation, the method comprising:

raising and lowering multiple lift plates using lift actuators, the lift actuators being supported by a generally rectangular frame supported by legs;

wherein the lift actuators are secured to trays supported by the generally rectangular frame, programmed to raise, and lower the lift plates in a predetermined manner when activated, the trays being suspended by transversely extending slats and only one lift plate being in each of the trays.

16. The method of claim 15, wherein the lift actuators are programmed to raise and lower the lift plates at predetermined times.

17. The method of claim 15, wherein the lift actuators are supported by slats of the generally rectangular frame.

18. The method of claim 15, wherein the lift actuators are in trays supported by slats of the generally rectangular frame.

19. The method of claim 18, wherein the trays are different sizes.

20. The method of claim 19, wherein some of the trays hold more than one lift actuator.

* * * * *